United States Patent
Murayama

(10) Patent No.: US 11,397,309 B2
(45) Date of Patent: Jul. 26, 2022

(54) IMAGING LENS SYSTEM AND IMAGING APPARATUS INCORPORATING THE SAME

(71) Applicant: Ricoh Company, Ltd., Tokyo (JP)

(72) Inventor: Minoru Murayama, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 798 days.

(21) Appl. No.: 16/240,856

(22) Filed: Jan. 7, 2019

(65) Prior Publication Data

US 2019/0250367 A1 Aug. 15, 2019

(30) Foreign Application Priority Data

Feb. 14, 2018 (JP) .............................. JP2018-024300

(51) Int. Cl.
*G02B 9/04* (2006.01)
*G02B 9/06* (2006.01)
*G02B 15/22* (2006.01)

(52) U.S. Cl.
CPC ............... *G02B 9/04* (2013.01); *G02B 9/06* (2013.01); *G02B 15/22* (2013.01)

(58) Field of Classification Search
CPC . G03B 3/00; G02B 5/005; G02B 9/00; G02B 9/04; G02B 9/06; G02B 9/24; G02B 9/64; G02B 13/002; G02B 13/006; G02B 13/009; G02B 13/0015; G02B 15/14; G02B 15/142; G02B 15/16; G02B 15/20;
(Continued)

(56) References Cited

U.S. PATENT DOCUMENTS 5,805,349 A * 9/1998 Sato .................... G02B 7/08
359/740
6,091,901 A 7/2000 Ogawa
(Continued)

FOREIGN PATENT DOCUMENTS

JP H11-174326 A 7/1999
JP 2010-01 4897 1/2010
(Continued)

OTHER PUBLICATIONS

English machine translation of JP-2015114366-A (Year: 2015).*
Office Action dated Sep. 28, 2021 in Japanese Patent Application No. 2018-024300, 3 pages.

*Primary Examiner* — Nicholas R. Pasko
(74) *Attorney, Agent, or Firm* — Xsensus LLP

(57) ABSTRACT

An imaging lens system includes a first group having positive power and a second group having positive power disposed in that order from an object side to an image. The first group includes a first sub-group and a second sub-group. The second group includes a third sub-group, a stop, and a fourth sub-group. Conditional expressions (1), (2), and (3) below are satisfied:

$$0.07 < f2/f1 < 0.4 \quad (1);$$

$$0.45 < f2/f2a < 0.7 \quad (2); \text{ and}$$

$$1.05 < f/R1aN < 1.55 \quad (3)$$

where
f denotes a focal length of an entirety of the imaging lens system focused at infinity,
f1 denotes a focal length of the first group,
f2 denotes a focal length of the second group focused at infinity,
f2a denotes a focal length of the third sub-group focused at infinity, and
R1aN denotes a radius of curvature of a surface closest to the image side within the first sub-group.

8 Claims, 23 Drawing Sheets

(58) Field of Classification Search
CPC .... G02B 27/00; G02B 27/0025; G02B 15/24; G02B 9/34; G02B 9/58; G02B 15/1421; G02B 15/144507; G02B 15/144511; G02B 15/144515; G02B 15/22–28; H04N 5/2254
USPC ....... 359/362, 554, 557, 642, 646, 676, 683, 359/684, 691
See application file for complete search history.

(56) References Cited

U.S. PATENT DOCUMENTS

| | | | | |
|---|---|---|---|---|
| 6,639,653 B2* | 10/2003 | Nagahama | ............. | G02B 13/22 359/663 |
| 7,619,833 B2* | 11/2009 | Kawakami | ............. | G02B 13/04 359/744 |
| 7,663,816 B2* | 2/2010 | Sato | ............. | G02B 13/04 359/793 |
| 8,018,663 B2* | 9/2011 | Ohashi | ............. | G02B 13/04 359/793 |
| 8,369,030 B2* | 2/2013 | Sudoh | ............. | G02B 9/04 359/752 |
| 8,379,329 B2* | 2/2013 | Nakayama | ............. | G02B 5/205 359/740 |
| 8,416,512 B2* | 4/2013 | Harada | ............. | G02B 15/1421 359/794 |
| 9,417,436 B2* | 8/2016 | Shirasuna | ............. | G02B 13/04 |
| 2018/0149842 A1* | 5/2018 | Zhang | ............. | G02B 13/0045 |

FOREIGN PATENT DOCUMENTS

| | | |
|---|---|---|
| JP | 2011-107450 | 6/2011 |
| JP | 2013-007856 | 1/2013 |
| JP | 2015-11 4366 | 6/2015 |
| JP | 2015114366 A * | 6/2015 |
| JP | 2016-057387 A | 4/2016 |

* cited by examiner

FIG. 31

EXAMPLE 1

| NO | R | D | N(D) | VD |
|---|---|---|---|---|
| 1 | 292.188 | 4.368 | 1.60342 | 38.0 |
| 2 | -508.040 | 2.400 | 1.61340 | 44.3 |
| 3 | 40.248 | 6.809 | | |
| 4 | 99.387 | 11.193 | 1.91082 | 35.2 |
| 5 | -61.124 | 1.950 | 1.61340 | 44.3 |
| 6 | 102.032 | 8.974 | | |
| 7 | -50.023 | 1.750 | 1.72047 | 34.7 |
| 8 | 95.253 | 6.188 | 1.61800 | 63.4 |
| 9 | -199.658 | 0.100 | | |
| 10 | 99.222 | 8.352 | 1.83481 | 42.7 |
| 11 | -84.561 | D11 | | |
| 12 | 54.801 | 4.434 | 1.85150 | 40.8 |
| 13 | 123.303 | 0.183 | | |
| 14 | 53.021 | 8.578 | 1.59522 | 67.7 |
| 15 | -75.909 | 1.550 | 1.60342 | 38.0 |
| 16 | 40.154 | 6.141 | | |
| 17 STOP | INFINITY | 3.791 | | |
| 18 | -45.293 | 1.270 | 1.60342 | 38.0 |
| 19 | 39.736 | 7.837 | 1.59522 | 67.7 |
| 20 | -57.921 | 0.978 | | |
| 21 | -41.379 | 3.134 | 1.88300 | 40.8 |
| 22 | -30.183 | 1.250 | 1.56732 | 42.8 |
| 23 | 96.931 | 0.632 | | |
| 24* | 67.722 | 6.658 | 1.77250 | 49.5 |
| 25* | -47.005 | D25 | | |
| 26 | INFINITY | 2.000 | 1.51633 | 64.1 |
| 27 | INFINITY | - | | |

ASPHERICAL DATA

| | | | |
|---|---|---|---|
| NO.24 K= 0.000 | A4=-0.3057E-05 | A6=-0.2560E-08 | A8=0.1404E-10 |
| | A10=-0.3622E-13 | A12=0.0000E+00 | |
| NO.25 K= 0.000 | A4=0.2344E-05 | A6=-0.4523E-08 | A8=0.1659E-10 |
| | A10=-0.3687E-13 | A12=0.0000E+00 | |

VARIOUS DATA

| | INFINITY | SHORT DISTANCE |
|---|---|---|
| F-NUMBER | 1.45 | 1.74 |
| FOCAL LENGTH | 49.57 | 48.01 |
| MAGNIFICATION | 0.000 | -0.184 |
| HALF ANGLE OF VIEW | 23.5 | 21.7 |
| IMAGE HEIGHT | 21.64 | 21.64 |
| BF | 1.00 | 1.00 |
| TOTAL LENS LENGTH | 149.24 | 149.24 |
| D11 | 10.407 | 1.012 |
| D25 | 37.310 | 46.706 |

FIG. 32

EXAMPLE 2

| NO | R | D | N(D) | VD |
|---|---|---|---|---|
| 1 | 283.247 | 4.395 | 1.60342 | 38.0 |
| 2 | -509.348 | 2.400 | 1.61340 | 44.3 |
| 3 | 40.430 | 6.958 | | |
| 4 | 104.125 | 10.815 | 1.91082 | 35.2 |
| 5 | -62.671 | 1.976 | 1.61340 | 44.3 |
| 6 | 105.664 | 8.760 | | |
| 7 | -51.298 | 1.940 | 1.72047 | 34.7 |
| 8 | 98.305 | 5.822 | 1.61800 | 63.4 |
| 9 | -251.783 | 0.100 | | |
| 10 | 95.176 | 8.311 | 1.83481 | 42.7 |
| 11 | -88.890 | D11 | | |
| 12 | 58.524 | 4.641 | 1.85150 | 40.8 |
| 13 | 163.406 | 0.171 | | |
| 14 | 54.163 | 8.716 | 1.59522 | 67.7 |
| 15 | -72.662 | 1.550 | 1.60342 | 38.0 |
| 16 | 42.486 | 5.953 | | |
| 17 STOP | INFINITY | 3.867 | | |
| 18 | -45.795 | 1.297 | 1.60342 | 38.0 |
| 19 | 37.139 | 8.061 | 1.59522 | 67.7 |
| 20 | -65.100 | 1.030 | | |
| 21 | -43.986 | 3.206 | 1.88300 | 40.8 |
| 22 | -31.161 | 1.284 | 1.56732 | 42.8 |
| 23 | 79.760 | 0.745 | | |
| 24* | 62.682 | 6.441 | 1.77250 | 49.5 |
| 25* | -47.562 | D25 | | |
| 26 | INFINITY | 2.000 | 1.51633 | 64.1 |
| 27 | INFINITY | - | | |

ASPHERICAL DATA

| NO.24 K= 0.000 | A4=-0.3124E-05 | A6=-0.9769E-09 | A8=0.6301E-11 |
|---|---|---|---|
| | A10=-0.1718E-13 | A12=0.0000E+00 | |
| NO.25 K= 0.000 | A4=0.2320E-05 | A6=-0.3117E-08 | A8=0.9134E-11 |
| | A10=-0.1825E-13 | A12=0.0000E+00 | |

VARIOUS DATA

| | INFINITY | SHORT DISTANCE |
|---|---|---|
| F-NUMBER | 1.45 | 1.74 |
| FOCAL LENGTH | 49.54 | 48.21 |
| MAGNIFICATION | 0.000 | -0.185 |
| HALF ANGLE OF VIEW | 23.6 | 21.5 |
| IMAGE HEIGHT | 21.64 | 21.64 |
| BF | 1.00 | 1.00 |
| TOTAL LENS LENGTH | 149.07 | 149.07 |
| D11 | 10.319 | 0.998 |
| D25 | 37.310 | 46.631 |

FIG. 33

EXAMPLE 3

| NO | R | D | N(D) | VD |
|---|---|---|---|---|
| 1 | 349.645 | 4.150 | 1.70154 | 41.2 |
| 2 | -576.370 | 2.172 | 1.65412 | 39.7 |
| 3 | 42.110 | 6.235 | | |
| 4 | 97.159 | 10.265 | 1.95375 | 32.3 |
| 5 | -76.475 | 1.900 | 1.61340 | 44.3 |
| 6 | 89.892 | 8.792 | | |
| 7 | -54.130 | 1.835 | 1.72047 | 34.7 |
| 8 | 79.111 | 6.651 | 1.59522 | 67.7 |
| 9 | -225.070 | 0.150 | | |
| 10 | 91.444 | 8.312 | 1.85150 | 40.8 |
| 11 | -95.474 | D11 | | |
| 12 | 57.844 | 4.585 | 1.89190 | 37.1 |
| 13 | 149.447 | 0.100 | | |
| 14 | 52.971 | 8.612 | 1.59522 | 67.7 |
| 15 | -84.885 | 1.500 | 1.62004 | 36.3 |
| 16 | 41.240 | 6.054 | | |
| 17 STOP | INFINITY | 3.992 | | |
| 18 | -47.066 | 1.200 | 1.59270 | 35.3 |
| 19 | 43.654 | 8.063 | 1.59522 | 67.7 |
| 20 | -56.408 | 1.077 | | |
| 21 | -39.455 | 3.002 | 1.83400 | 37.2 |
| 22 | -28.374 | 1.201 | 1.57501 | 41.5 |
| 23 | 79.764 | 0.771 | | |
| 24* | 62.931 | 6.871 | 1.77250 | 49.5 |
| 25* | -46.020 | D25 | | |
| 26 | INFINITY | 2.000 | 1.51633 | 64.1 |
| 27 | INFINITY | - | | |

ASPHERICAL DATA

| NO.24 K= 0.000 | A4=-0.3063E-05 | A6=-0.2113E-09 | A8=0.6205E-15 |
|---|---|---|---|
| | A10=0.0000E+00 | A12=0.0000E+00 | |
| NO.25 K= 0.000 | A4=0.2471E-05 | A6=-0.1960E-08 | A8=0.1770E-11 |
| | A10=0.0000E+00 | A12=0.0000E+00 | |

VARIOUS DATA

| | INFINITY | SHORT DISTANCE |
|---|---|---|
| F-NUMBER | 1.46 | 1.75 |
| FOCAL LENGTH | 49.37 | 48.06 |
| MAGNIFICATION | 0.000 | -0.185 |
| HALF ANGLE OF VIEW | 23.7 | 21.7 |
| IMAGE HEIGHT | 21.64 | 21.64 |
| BF | 1.00 | 1.00 |
| TOTAL LENS LENGTH | 148.11 | 148.11 |
| D11 | 10.260 | 1.003 |
| D25 | 37.361 | 46.617 |

FIG. 34

EXAMPLE 4

| NO | R | D | N(D) | VD |
|---|---|---|---|---|
| 1 | 104.013 | 2.400 | 1.61340 | 44.3 |
| 2 | 36.800 | 8.312 | | |
| 3 | 110.557 | 9.669 | 1.95375 | 32.3 |
| 4 | -81.505 | 3.084 | 1.65412 | 39.7 |
| 5 | 92.079 | 8.632 | | |
| 6 | -59.324 | 5.031 | 1.72825 | 28.5 |
| 7 | 183.793 | 2.203 | | |
| 8 | 85.399 | 9.113 | 1.85150 | 40.8 |
| 9 | -84.157 | D 9 | | |
| 10 | 51.139 | 5.116 | 1.89190 | 37.1 |
| 11 | 129.404 | 0.150 | | |
| 12 | 57.828 | 10.114 | 1.59522 | 67.7 |
| 13 | -55.381 | 1.530 | 1.60342 | 38.0 |
| 14 | 43.720 | D14 | | |
| 15 STOP | INFINITY | 4.248 | | |
| 16 | -52.506 | 1.240 | 1.62004 | 36.3 |
| 17 | 30.591 | 8.132 | 1.59522 | 67.7 |
| 18 | -68.312 | 1.394 | | |
| 19 | -40.891 | 3.417 | 1.77250 | 49.6 |
| 20 | -29.680 | 1.240 | 1.53172 | 48.9 |
| 21 | 121.043 | 0.425 | | |
| 22* | 64.835 | 6.089 | 1.77250 | 49.5 |
| 23* | -50.786 | D23 | | |
| 24 | INFINITY | 2.000 | 1.51633 | 64.1 |
| 25 | INFINITY | — | | |

ASPHERICAL DATA

| | | | |
|---|---|---|---|
| NO.22 K= 0.000 | A4=-0.2807E-05 | A6=-0.7696E-09 | A8=0.4524E-11 |
| | A10=0.0000E+00 | A12=0.0000E+00 | |
| NO.23 K= 0.000 | A4=0.2846E-05 | A6=-0.2111E-08 | A8=0.6275E-11 |
| | A10=0.0000E+00 | A12=0.0000E+00 | |

VARIOUS DATA

| | INFINITY | SHORT DISTANCE |
|---|---|---|
| F-NUMBER | 1.45 | 1.74 |
| FOCAL LENGTH | 49.40 | 48.60 |
| MAGNIFICATION | 0.000 | -0.186 |
| HALF ANGLE OF VIEW | 23.6 | 21.3 |
| IMAGE HEIGHT | 21.64 | 21.64 |
| BF | 1.00 | 1.00 |
| TOTAL LENS LENGTH | 147.51 | 147.51 |
| D9 | 9.862 | 1.002 |
| D14 | 5.793 | 5.267 |
| D23 | 37.310 | 46.696 |

FIG. 35

EXAMPLE 5

| NO | R | D | N(D) | VD |
|---|---|---|---|---|
| 1 | 241.904 | 4.112 | 1.62004 | 36.3 |
| 2 | -2306.889 | 2.400 | 1.56732 | 42.8 |
| 3 | 38.635 | 6.864 | | |
| 4 | 84.600 | 10.756 | 1.95375 | 32.3 |
| 5 | -76.603 | 1.950 | 1.65412 | 39.7 |
| 6 | 73.847 | 9.755 | | |
| 7 | -51.708 | 1.750 | 1.72047 | 34.7 |
| 8 | 80.707 | 6.701 | 1.61800 | 63.4 |
| 9 | -200.156 | 0.100 | | |
| 10 | 89.779 | 8.464 | 1.83481 | 42.7 |
| 11 | -89.779 | D11 | | |
| 12 | 56.215 | 4.158 | 1.89190 | 37.1 |
| 13 | 125.997 | 0.595 | | |
| 14 | 47.750 | 8.581 | 1.59522 | 67.7 |
| 15 | -86.975 | 1.550 | 1.61293 | 37.0 |
| 16 | 37.561 | D16 | | |
| 17 STOP | INFINITY | 4.242 | | |
| 18 | -45.351 | 1.328 | 1.62004 | 36.3 |
| 19 | 38.833 | 7.782 | 1.53775 | 74.7 |
| 20 | -46.263 | 0.639 | | |
| 21 | -38.468 | 3.152 | 1.85150 | 40.8 |
| 22 | -27.602 | 1.250 | 1.60342 | 38.0 |
| 23 | 107.929 | 0.317 | | |
| 24* | 61.959 | 6.768 | 1.80860 | 40.4 |
| 25* | -47.453 | D25 | | |
| 26 | INFINITY | 2.000 | 1.51633 | 64.1 |
| 27 | INFINITY | — | | |

ASPHERICAL DATA

| | | | |
|---|---|---|---|
| NO.24 K= 0.000 | A4=-0.3233E-05 | A6=-0.1403E-08 | A8=0.1399E-10 |
| | A10=-0.3769E-13 | A12=0.0000E+00 | |
| NO.25 K= 0.000 | A4=0.2330E-05 | A6=-0.3843E-08 | A8=0.1874E-10 |
| | A10=-0.4213E-13 | A12=0.0000E+00 | |

VARIOUS DATA

| | INFINITY | SHORT DISTANCE |
|---|---|---|
| F-NUMBER | 1.45 | 1.73 |
| FOCAL LENGTH | 50.00 | 48.74 |
| MAGNIFICATION | 0.000 | -0.187 |
| HALF ANGLE OF VIEW | 23.5 | 21.3 |
| IMAGE HEIGHT | 21.64 | 21.64 |
| BF | 1.00 | 1.00 |
| TOTAL LENS LENGTH | 148.79 | 149.88 |
| D11 | 9.858 | 1.068 |
| D16 | 5.411 | 5.934 |
| D25 | 37.310 | 46.662 |

FIG. 36

| CLAIM | EXPRESSION NUMBER | CONDITIONAL EXPRESSION | LOWER LIMIT | UPPER LIMIT | EXAMPLE 1 | EXAMPLE 2 | EXAMPLE 3 | EXAMPLE 4 | EXAMPLE 5 |
|---|---|---|---|---|---|---|---|---|---|
| 1,2 | (1) | f2/f1 | 0.07 | 0.4 | 0.35 | 0.29 | 0.29 | 0.12 | 0.34 |
| 1,2 | (2) | f2/f2a | 0.45 | 0.7 | 0.49 | 0.57 | 0.54 | 0.63 | 0.52 |
| 1 | (3) | f/R1aN | 1.05 | 1.55 | 1.23 | 1.23 | 1.17 | 1.34 | 1.29 |
| 3 | (4) | f/f1a | −0.75 | −0.45 | −0.65 | −0.64 | −0.66 | −0.52 | −0.60 |
| 4 | (5) | n12P | 1.75 | | 1.91082 | 1.91082 | 1.95375 | 1.95375 | 1.95375 |
| 5 | (6) | n2GN | 1.55 | 1.62 | 1.59 | 1.59 | 1.60 | 1.59 | 1.61 |
| 6 | (7) | ν2aP | 50 | | 54.26 | 54.26 | 52.43 | 52.43 | 52.43 |
| 7 | (8) | νd11 | 30 | 50 | 38.03 | 38.03 | 41.24 | | 42.82 |
| 7 | (9)LEFT SIDE | θgF11 | RIGHT SIDE | | 0.5835 | 0.5835 | 0.5765 | | 0.5731 |
| 7 | (9)RIGHT SIDE | *1 | | | 0.5799 | 0.5799 | 0.5735 | | 0.5704 |
| 8 | (10) | νd22 | 55 | | 67.74 | 67.74 | 67.74 | 67.74 | 74.70 |
| 8 | (11)LEFT SIDE | θgF22 | RIGHT SIDE | | 0.5442 | 0.5442 | 0.5442 | 0.5442 | 0.5392 |
| 8 | (11)RIGHT SIDE | *2 | | | 0.5303 | 0.5303 | 0.5303 | 0.5303 | 0.5190 |
| 8 | (12) | n2P | 1.7 | | 1.883 | 1.883 | 1.834 | 1.7725 | 1.8515 |

*1: $-0.002 \times \nu d11 + 0.656$

*2: $-0.00162 \times \nu d21 + 0.64$

IMAGING LENS SYSTEM AND IMAGING APPARATUS INCORPORATING THE SAME

CROSS-REFERENCE TO RELATED APPLICATION

This patent application is based on and claims priority pursuant to 35 U.S.C. § 119(a) to Japanese Patent Application No. 2018-024300, filed on Feb. 14, 2018, in the Japan Patent Office, the entire disclosure of which is hereby incorporated by reference herein.

BACKGROUND

Technical Field

Embodiments of the present disclosure relate to an imaging lens system and an imaging apparatus incorporating the imaging lens system.

Background Art

As a standard lens having a back focal length sufficient for a single-lens reflex camera, an F-value of appropriately 1.4, and an angle of view of approximately 45 degrees, a modified-double Gauss having a symmetrical configuration in which lenses are arranged to be substantially symmetrical with respect to the stop is known. Further, another type of lens configuration is known to obtain a long back focus while improving the depiction performance. In the configuration, a lens group that serves as a front convertor is disposed in front of the focusing group, and the negative lens group is a leading lens group in the front-convertor group.

SUMMARY

In one aspect of this disclosure, there is provided an imaging lens system includes a first group having positive power; and a second group having positive power. The first group and the second group are disposed in that order from an object side to an image side of the imaging lens system. The first group includes a first sub-group and a second sub-group adjacent to the first sub-group on the image side, the first sub-group including a lens closest to the object side at one end of the first sub-group and a negative lens component closest to the object side at another end of the first sub-group. The second group includes a third sub-group, a stop, and a fourth sub-group disposed in that order from the object side to the image side. The second group is configured to be movable to the object side with a change in a distance between the first group and the second group during a change in a focus of the imaging lens system from infinity to close range. Conditional expressions (1), (2), and (3) below are satisfied:

$$0.07 < f2/f1 < 0.4 \quad (1);$$

$$0.45 < f2/f2a < 0.7 \quad (2); \text{ and}$$

$$1.05 < f/R1aN < 1.55 \quad (3)$$

where
f denotes a focal length of an entirety of the imaging lens system focused at infinity,
f1 denotes a focal length of the first group,
f2 denotes a focal length of the second group when the imaging lens system is focused at infinity,
f2a denotes a focal length of the third sub-group when the imaging lens system is focused at infinity, and R1aN denotes a radius of curvature of a surface closest to the image side within the first sub-group.

In another aspect of this disclosure, there is provided an improved imaging lens system including a first group having positive power and a second group having positive power. The first group includes two or more positive lenses and three or more negative lenses. The first group and the second group are disposed in that order from an object side to an image side of the imaging lens system. The first group includes a first sub-group and a second sub-group adjacent to the first sub-group on the image side. The first sub-group includes a lens closest to the object side at one end of the first sub-group and a negative lens component closest to the object side at another end of the first sub-group. The second group includes a third sub-group, a stop, and a fourth sub-group disposed in that order from the object side to the image side. The second group is configured to be movable to the object side with a change in a distance between the first group and the second group during a change in a focus of the imaging lens system from infinity to close range. Conditional expressions (1) and (2) below are satisfied:

$$0.07 < f2/f1 < 0.4 \quad (1); \text{ and}$$

$$0.45 < f2/f2a < 0.7 \quad (2),$$

where
f1 denotes a focal length of the first group,
f2 denotes a focal length of the second group, and
f2a denotes a focal length of the third sub-group.

In still another aspect of this disclosure, there is provided an improved imaging apparatus including the above described imaging lens system.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 31 is a table of the optical data of the imaging lens system according to Example 1;

FIG. 32 is a table of the optical data of the imaging lens system according to Example 2;

FIG. 33 is a table of the optical data of the imaging lens system according to Example 3;

FIG. 34 is a table of the optical data of the imaging lens system according to Example 4;

FIG. 35 is a table of the optical data of the imaging lens system according to Example 5;

FIG. 36 is a table of values of conditional expressions relating to the imaging lens systems according to 1 to 5.

Figure 1:
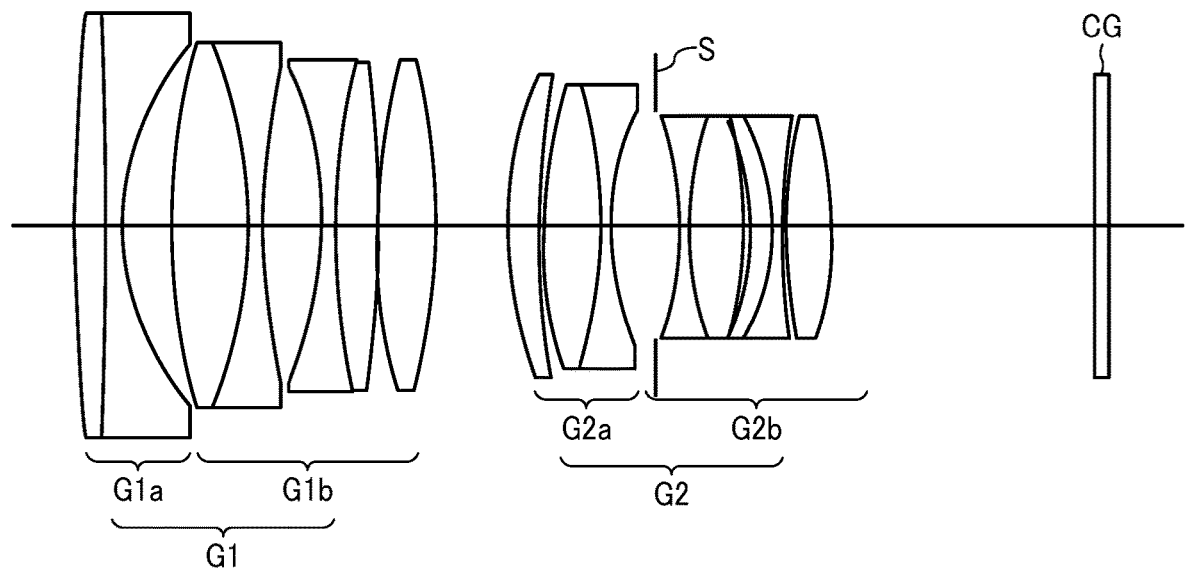
FIG. 1 is a cross-sectional view of lenses arranged in an imaging lens system according to Example 1 focused at infinity.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Embodiments of the present disclosure are described in detail with reference to the drawings. Like reference numerals designate identical or corresponding components throughout the several views and a description of same is omitted.

The embodiments of the present disclosure are described with reference to FIG. 1.

FIG. 1 is an illustration (cross-sectional view) of a lens configuration of an imaging lens system 1 according to Example 1 of the present disclosure. In FIG. 1, the imaging lens system 1 according to Example 1 is focused at infinity. The left side is the object side and the right side is the image side. In the embodiments of the present disclosure, it is assumed that an image sensor reads an object image formed by the imaging lens system 1. The image sensor has, for example, various kinds of filters, such as a low pass filter and an infrared cut filter, and a cover glass on the light-receiving surface. In FIG. 1, the imaging lens system 1 includes a transparent-parallel plate CG that is optically equivalent to the above-described filters and cover glass.

The imaging lens system 1 according to the embodiments of the present disclosure further includes a first group G1 having positive power and a second group G2 having positive power, which are arranged in that order from the object side (the left in FIG. 1) to the image side (the right). That is, the power exerted over the imaging lens system 1 is divided into positive refractive power and positive refractive power in that order from the object side to the image side.

The first group G1 includes a group G1a and a group G1b next to the group G1a on the image side. The group G1a includes a lens closest to the object side and a lens having a negative component (a negative lens closest to the object side among negative lenses in the imaging lens system 1) at the respective ends of the group G1a. That is, the group G1a ranges from the lens closest to the object side to the negative component closest to the object side among negative lenses in the imaging lens system 1.

The "lens having a negative component" refers to one negative lens or a cemented lens formed by joining a plurality of lenses together to have negative refractive power as a whole. In the example described below, the negative lens component in the group G1a refers to a cemented lens formed by joining together a biconvex lens disposed closest to the object side and a biconcave lens with an image-side surface having a great curvature, the cemented lens having negative refractive power as a whole.

The second group G2 includes a group G2a, a stop S, and a group G2b, which are arranged in that order from the object side to the image side.

In changing the focus of the imaging lens system 1 from infinity to short range, the second group G2 moves to the object side while changing a distance to the first group G1.

In the imaging lens system 1 according to an embodiment of the present disclosure, the following conditional expressions (1), (2), and (3) are satisfied where f denotes the focal length of the entirety of the imaging lens system 1 focused at infinity, f1 denotes the focal length of the first group G1: f2 denotes the focal length of the second group G2, f2a denotes the focal length of the group G2a, and R1aN denotes the radius of curvature of a surface of a lens closest to the image side within the group G1a.

$$0.07 < f2/f1 < 0.4 \quad (1)$$

$$0.45 < f2/f2a < 0.7 \quad (2)$$

$$1.05 < f/R1aN < 1.55 \quad (3)$$

Such a configuration of the imaging lens system 1 is referred to as "configuration 1".

The imaging lens system 1 according to another embodiment of the present disclosure may be configured as follows.

The imaging lens system 1 according to another embodiment of the present disclosure includes a first group G1 having positive power and a second group G2 having positive power, which are sequentially arranged in that order from the object side to the image side. The first group G1 includes two or more positive lenses and three or more negative lenses. Further, the first group G1 includes a group G1a and a group G1b adjacent to the group G1a on the image side. The group G1a ranges from a lens closest to the object side to a lens having a negative component (a negative lens closest to the object side among negative lenses in the imaging lens system 1). That is, the group G1a includes the lens closest to the object side at one end of the group G1a and the lens having a negative component on the other end of the group G1a. The second group G2 includes a group G2a, a stop S, and a group G2b, which are arranged in that order from the object side to the image side. In changing the focus of the imaging lens system 1 from infinity to short range, the second group G2 moves to the object side while changing a distance to the first group G1.

In the imaging lens system 1 according to the present embodiment, the following conditional expressions (1) and (2) are satisfied where f1 denotes the focal length of the first group G1, f2 denotes the focal length of the second group G2, and f2a denotes the focal length of the group G2a.

$$0.07 < f2/f1 < 0.4 \quad (1)$$

$$0.45 < f2/f2a < 0.7 \quad (2)$$

Such a configuration is referred to as "configuration 2".

In the imaging lens system 1 according to any one of the configuration 1 and the configuration 2, the following conditional expression (4) is preferably further satisfied where f denotes the focal length of the entirety of the imaging lens system 1 focused at infinity, and f1a denotes the focal length of the group G1a.

$$-0.75 < f/f1a < -0.45 \quad (4)$$

This configuration is referred to as a "configuration 3".

In imaging lens system 1 according to any one of the configuration 1, the configuration 2, and the configuration 3, the group includes a cemented lens having a positive lens component, a negative lens/a cemented lens having a negative lens component, and a positive lens, which are arranged in that order from the object side to the image side. The cemented lens having the positive lens component is formed by joining a positive lens with a convex surface facing the object side and a negative lens together to have positive power. In the imaging lens system 1 according to any one of the configuration 1, the configuration 2, and the configuration 3, the following conditional expression (5) is further satisfied where n12P denotes the refractive index of material of the positive lens adjacent to the negative lens closest to the object side, on the image side.

$$1.75 < n12P \quad (5)$$

This configuration is referred to as a "configuration 4".

In imaging lens system 1 according to any one of the configuration 1, the configuration 2, the configuration 3, and the configuration 4, the second group G2 includes one or more negative lenses. Further, the following conditional expression (6) is satisfied where n2GN denotes the average of the refractive indexes of material of the one or more negative lenses within the second group G2.

$$1.55 < n2GN < 1.62 \quad (6)$$

This configuration is referred to as a "configuration 5".

In the imaging lens system 1 according to of any one of the configurations 1 to 5, the group G2a includes one or more positive lenses and one or more negative lenses. Further, the following conditional expression (7) is satisfied where ν2aP denotes the Abbe number of material of the one or more positive lenses within the group G2a $$50 < \nu 2aP \quad (7)$$

This configuration is referred to as a "configuration 6".

In the imaging lens system 1 according to of any one of the configurations 1 to 6, the group G1a includes a positive lens with a convex surface facing the object side and a negative lens, which are arranged in that order from the object side to the image side. Further, the following conditional expressions (8) and (9) are satisfied where νd11 denotes the Abbe number of material of the positive lens closest to the object side within the group G1a and θgF11 denotes the partial dispersion ratio with respect to the g line of the positive lens closest to the object side within the group G1a.

$$30 < vd11 < 50 \quad (8)$$

$$\theta gF11 > -0.002 \times vd11 + 0.656 \quad (9)$$

This configuration is referred to as a "configuration 7".

In the imaging lens system 1 of any one of the constitutions 1 to 7, the group G2b includes an object-side cemented lens and an image-side cemented lens, which are arranged in that order from the object side to the image side. The object-side cemented lens is formed by joining a negative lens and a positive lens together. The image-side cemented lens is formed by joining a positive meniscus lens with a convex surface facing the image side and a negative lens together. Further, the following conditional expressions (10), (11), and (12) are satisfied where vd22 denotes the Abbe number of material of the positive lens of the object-side cemented lens, θgF22 denotes the partial dispersion ratio with respect to the g line of the positive lens of the object-side cemented lens, and n2P denotes the refractive index of material of the positive meniscus lens of the image-side cemented lens.

$$vd22 > 55 \quad (10)$$

$$\theta gF22 > -0.00162 \times vd22 + 0.64 \quad (11)$$

$$1.70 < n2P \quad (12)$$

This configuration is referred to as a "configuration 8".

That is, the imaging lens systems 1 according to the configurations 1 to 8 includes the first group G1 having positive power and the second group G2 having positive power, which are sequentially arranged in that order from the object side to the image side.

By exerting positive power on the first group G1, the first group G1 converges an object light (light of an object) and the converged light enters the second group G2. This configuration enables the ratio of power between the first group G1 and the second group G2 to be adjusted, so as to prevent the light rays from the first group G1 from diverging and reduce the height of the light rays incident on the second group G2 when the imaging lens system 1 is focused on an object at close range.

In the configuration 1, the radius of curvature (R1aN) of the surface closest to the image side within the group G1a satisfies conditional expression (3), which prevents the negative power of the concave surface facing the image side from becoming excessive. In the group G1a, the off-axis light beam is furthest from the optical axis among the off-axis light beams in the imaging lens system 1. By preventing an excessive increase in the curvature of the concave surface closest to the image side within the group G1a, an increase in sagittal coma aberration and astigmatism can be prevented.

In the configuration 2, the first group G1 includes three or more negative lenses so as to share the negative power among a plurality of negative lenses within the first group G1. Accordingly, the power of each negative lens in the first group G1 is prevented from becoming too strong. Note that the first group G1 has positive power as a whole. To exert positive power on the first group G1 as a whole, the first group G1 is configured to include two or more positive lenses, which enables the light rays diverged by each negative lens to be converged smoothly.

The above-described configurations can reduce fluctuations in aberration occurring at the concave surface of the negative lens closest to the object side within the first group G1 and the height of the light rays incident on the second group G2 even when the distance to the object changes. As a result, fluctuations in performance due to the change in focus can be reduced.

In the configuration 3, the focal length (f1a) of the group G1a satisfies conditional expression (4). Accordingly, the group G1a has negative power. By exerting negative power on the group G1a, the imaging lens system 1 is configured to have a retro-focus system as a whole. As a result, the imaging lens system 1 can obtain a back focus and enable the off-axis light beams to be refracted gently, thus preventing an increase in aberrations.

In order to successfully correct chromatic aberration, the group G1a preferably includes a positive lens on the object side in any of the configurations 1 to 8.

In the configuration 4, the group G1b includes the cemented lens formed by joining a positive lens with a convex surface facing the object side and a negative lens together, a negative lens/a cemented lens formed by joining a negative lens and a positive lens to have a negative power (a negative lens component), and a positive lens.

With such a configuration, the convex surface closest to the object side within the group G1b can successfully correct aberration occurring at the concave surface closest to the image side within the group G1a (the configuration 1). Further, by disposing the negative lens component on the image side relative to the lens having the convex surface, the off-axis light beams can be refracted gently. By disposing the positive lens on a position closest to the image side within the group G1b, the light rays diverged by the negative lens or the negative lens component on the object side relative to the positive lens is converged by the positive lens and the converged light is guided to the second group G2.

In the configurations 1 and 2, conditional expression (2) is satisfied. Accordingly, the group G2a has positive power.

In Examples 1 to 5 described later, the group G2a includes a positive single lens and a cemented lens formed by joining a positive lens and a negative lens with a concave surface facing the image side together, which are arranged in that order from the object side to the image side. On the object side relative to the stop S, the axial light flux is diverged by the negative lenses of the group G1a and the group G1b. The diverged light flux is converged by the positive power of the group G2a so that there is no need to increase the aperture diameter. In order to successfully correct various aberrations, the group G2a preferably includes one or more positive lenses and one or more negative lens.

In the configuration 8, the group G2b includes an object-side cemented lens and an image-side cemented lens, which are arranged in that order from the object side to the image side. The object-side cemented lens is formed by joining a negative lens and a positive lens together. The image-side cemented lens is formed by joining a positive meniscus lens with a convex surface facing the image side and a negative lens together.

Each of the group G2a and the group G2b has positive power with respect to the stop S. Further, both the cemented lenses close to the stop S form a symmetrical shape with the stop S therebetween. Accordingly, distortion aberration and coma aberration are canceled out, resulting in a successful correction of aberrations. The lens closest to the image side has an aspherical surface to correct aberrations of the axial light rays and the off-axis light rays in a well-balanced manner, because the lens closest to the image side has a large converging power and the off-axis principal ray passes through a position higher than the optical axis.

The following describes a change in (changing) focus from infinity to close range in the imaging lens system 1 according to the embodiments of the present disclosure.

In the imaging lens system 1 according to any of the configurations 1 to 8, the second group G2 moves to the object side while changing the distance to the first group G1 in changing the focus from infinity to close range.

In changing the focus described above, the first group G1 may be stationary (stay still) or may be movable.

The second group G2 may move as a whole in changing the focus. Alternatively, the group 2Ga and the group 2Gb of the second group G2 may move by different amounts (distances) between each other in changing the focus (which is called floating system).

As a favorable focusing mechanism, the first group G1 is configured to be stationary with respect to the image plane because each lens in the first group G1 has a larger radius and more heavy than in the second group G2.

Each of the above-described conditional expressions is described below.

The conditional expression (1) defines the power ratio (f2/f1) between the positive first group G1 and the positive second group G2. When the value of f2/f1 exceeds the upper limit defined by conditional expression (1), the power of the first group G1 distant from the stop S increases, and coma aberration and distortion increase. When the value of f2/f1 falls below the lower limit defined by conditional expression (1), the power of the first group G1 decreases, which reduces the degree of convergence of the light rays from the first group G1. As a result, spherical aberration and coma aberration are difficult to successfully correct when the imaging lens system 1 is focused at both infinity and close range. It is preferable that the parameter "f2/f1" of conditional expression (1) satisfies the following conditional expression (1A) whose range is slightly narrower than the above-described conditional expression (1).

$$0.1 < f2/f1 < 0.37 \tag{1A}$$

The conditional expression (2) defines the power of the group G2a in the second group G2. When the value of f2/f2a exceeds the upper limit defined by conditional expression (2), the power of the group G2a increases so that spherical aberration and curvature of field adversely increase. When the value of f2/f2a falls below the lower limit defined by conditional expression (2), the positive power of the group G2a decreases, which increases the diameter of the stop S disposed immediately after the group G2a. As a result, spherical aberration and curvature of field adversely increase. It is preferable that the parameter "f2/f2a" of conditional expression (2) satisfies the following conditional expression (2A) whose range is slightly narrower than the above-described conditional expression (2).

$$0.47 < f2/f2a < 0.68 \tag{2A}$$

The conditional expression (3) defines the radius of curvature of the surface closest to the image side within the group G1a, and represents that the surface closest to the image side within the group G1a is concave in the configuration 1. Assuming that the angle of view is approximately 45 degrees and the F-value is appropriately 1.4, the incoming off-axis light beam becomes thick, and the off-axis light rays pass through positions distant from the optical axis in the group G1a. To avoid such a situation, the radius of curvature is appropriately defined. When the value of f/R1aN exceeds the upper limit defined by conditional expression (3), the radius of curvature of the surface closest to the image side within the group G1a decreases so that the sagittal coma aberration and astigmatism adversely increase. Moreover, with a change in distance to the object, the fluctuations in spherical aberration increase. When the value off/R1aN falls below the lower limit defined by conditional expression (3), the spherical aberration and curvature of field lack correction. It is preferable that the parameter "f/R1aN" of conditional expression (3) satisfies the following conditional expression (3A) whose range is slightly narrower than the above-described conditional expression (3).

$$1.15 < f/R1aN < 1.45 \tag{3A}$$

In the configuration 3, by exerting negative power on the group G1a, the imaging lens system 1 is configured to have a retro-focus system as a whole. As a result, the imaging lens system 1 can obtain a back focus and enable the off-axis light beams to be refracted gently, thus preventing an increase in aberrations.

When the value of f/f1a exceeds the upper limit defined by conditional expression (4), the negative power of the group G1a is too weak, which results in lack of correction of astigmatism and coma aberration. When the value of f/f1a falls below the lower limit defined by conditional expression (4), the negative power of the group G1a is too strong, which increases the sagittal coma aberration and distortion. It is preferable that the parameter "f/f1a" of conditional expression (4) satisfies the following conditional expression (4A) whose range is slightly narrower than the above-described conditional expression (4).

$$-0.7 < f/f1a < -0.5 \tag{4A}$$

The conditional expression (5) defines the refractive index (n12P) of the material of the positive lens closest to the object side within the group G1b in the configuration 4. When the value of n12P falls below the lower limit defined by conditional expression (5), the radius of curvature of the object-side surface of the positive lens is more likely to involve a reducing correction (correction to reduce the radius of curvature) and the coma aberration and astigmatism are more likely to increase.

More preferably, the refractive index (n12P) satisfies the following conditional expression (5A).

$$1.85 < n12P \tag{5A}$$

In the configuration 5, the second group G2 includes one or more negative lenses, and the conditional expression (6) defines the average (n2GN) of the refractive indexes of the material of the one or more negative lenses included in the second group G2. When the second group G2 includes one negative lens, the average (n2GN) is the refractive index of the material of the one negative lens.

The conditional expression (6) defines the range of the average (n2GN).

When the value of n2GN exceeds the upper limit defined by conditional expression (6), the refractive index of the negative lens becomes high, the Petzval sum tends to be large, and the curvature of field tends to become large. When the value of n2GN falls below the lower limit defined by conditional expression (6), the radius of curvature tends to be small in order to obtain the sufficient power, and the coma and astigmatism tend to become large.

In the configuration 6, the group G2a includes one or more positive lenses and one or more negative lenses. The Abbe number (v2aP) of the material of the one or more positive lenses within the group G2a satisfies the following conditional expression (7).

$$50 < v2aP \tag{7}$$

The conditional expression (7) defines the average of the Abbe numbers of the positive lenses of the group G2a. When the value of ν2aP falls below the lower limit defined by conditional expression (7), axial chromatic aberration tends to significantly occur.

In the configuration 7, the group G1a includes a positive lens with a convex surface facing the object side and a negative lens, which are sequentially arranged in that order from the object side to the image side. The Abbe number (vd11) and the partial dispersion ratio (θgF11) with respect to the g line of the material of the positive lens closest to the object side within the group G1a preferably satisfy the conditional expressions (8) and (9), so as to successfully correct chromatic aberration.

The conditional expression (8) defines the Abbe number of the material of the positive lens as described above. When the value of vd11 exceeds the upper limit defined by conditional expression (8), lateral chromatic aberration is likely to be difficult to correct. When the value of vd11 falls below the lower limit defined by conditional expression (8), the axial chromatic aberration is more likely to increase.

When the value of θgF11 falls below the lower limit defined by conditional expression (9), the secondary spectrum of the g-line of the axial chromatic aberration is more likely to be difficult to correct. The partial dispersion ratio (θgF) with respect to the g line is defined by the following equation where ng, nF and nC denote the refractive indexes of the g line, the F line, and the C line, respectively:

$$\theta gF=(ng-nF)/(nF-nC).$$

In the configuration 8, the group G2b includes an object-side cemented lens and an image-side cemented lens, which are arranged in that order from the object side to the image side. The object-side cemented lens is formed by joining a negative lens and a positive lens together. The image-side cemented lens is formed by joining a positive meniscus lens with a convex surface facing the image side and a negative lens together. The Abbe number (vd22) and the partial dispersion ratio (θgF22) with respect to the g line of material of the positive lens of the object-side cemented lens preferably satisfy the conditional expressions (10) and (11). The refractive index (n2P) of material of the positive meniscus lens of the image-side cemented lens preferably satisfies the conditional expression (12).

By satisfying the conditional expressions (10) and (11), the axial chromatic aberration, particularly the secondary spectrum, can be successfully corrected. Further, the glass material that satisfies the conditional expressions (10) and (11) typically has a low refractive index. For such a reason, when the meniscus lens with a convex surface facing the image side satisfies the conditional expression (12), the Petzval sum is reduced while the spherical aberration and curvature of field on the concave surface on the object side can be successfully corrected. Further, the lens closest to the image side within the group G2b preferably has an aspherical surface. With such a configuration, the lens closest to the image side within the group G2b exhibits a great convergence power. Further, in such a configuration, the aspherical surface is provided on the lens (the last lens in the imaging lens system 1) closest to the image side, in which the off-axis principal light rays pass through the positions distant from the optical axis. Accordingly, the spherical aberration, coma aberration, and astigmatism are corrected in well-balanced manner.

Figure 37A:
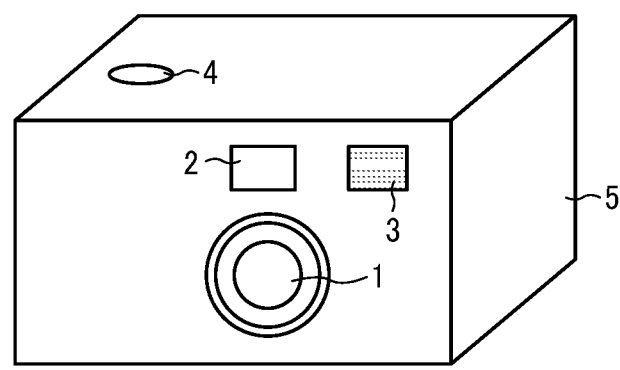
FIGS. 37A, 37B, and 37C are illustrations of an imaging apparatus according to an embodiment of the present disclosure.
Figure 37B:
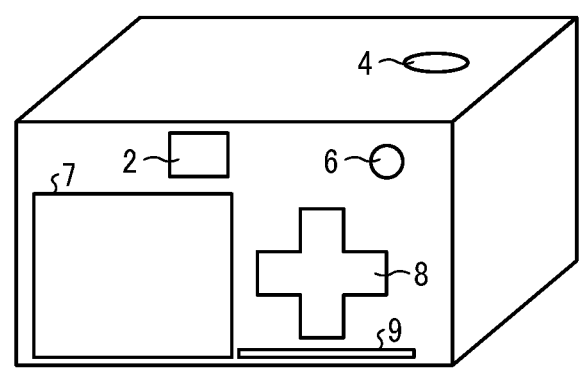
Figure 37C:
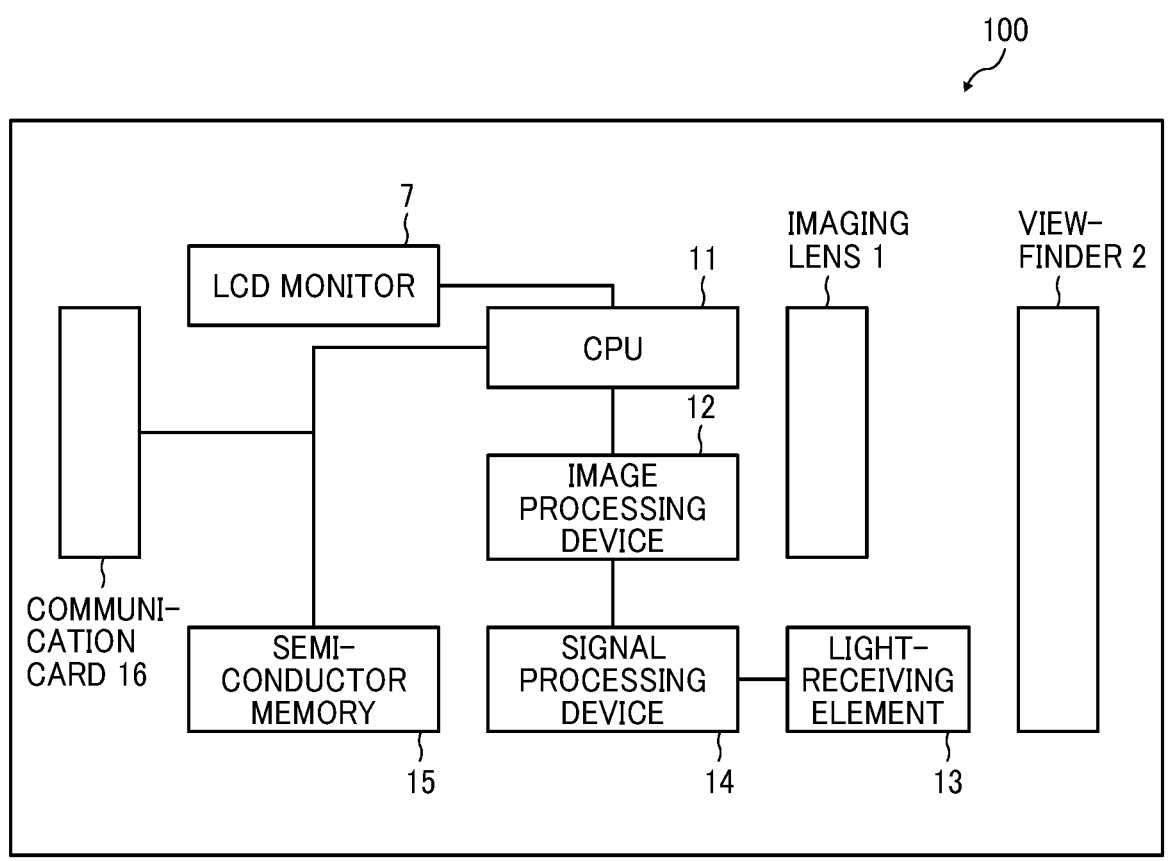

An embodiment of an imaging apparatus 100 is described with referring to FIGS. 37A, 37B, and 37C. The imaging apparatus 100 is, for example, a portable information terminal apparatus.

FIG. 37A is an illustration of a front side and an upper side of the portable information terminal apparatus. FIG. 37B is an illustration of a back side and the upper side of the portable information terminal apparatus.

The portable information terminal apparatus includes the imaging lens system 1 according to any one of Examples 1 to 5.

As illustrated in FIGS. 37A and 37B, the portable information terminal apparatus includes a viewfinder 2, a flash 3, a shutter button 4, a casing 5, a power switch 6, a liquid crystal monitor 7, an operation button 8, and a memory card slot 9.

FIG. 37C is a block diagram of a hardware configuration of the portable information terminal apparatus.

As illustrated in FIG. 37C, the portable information terminal apparatus includes the imaging lens system 1 and the image sensor 13. The imaging lens system 1 forms an image of an object, and the image sensor 13 reads the formed image.

The portable information terminal apparatus further includes a central processing unit (CPU) 11, an image processing device 12, a signal processing device 14, and a semiconductor memory 15. The signal processing device 14 converts an output of the image sensor 13 into digital information under the control of the CPU 11. That is, the portable information terminal apparatus is capable of converting the captured image into digital information.

The captured image converted to digital information is further processed by the image processing device 12 under the control of the CPU 11. The image processed by the image processing device 12 may be displayed on the liquid crystal monitor 7 or may be stored in the semiconductor memory 15. The image-capturing operation is performed vis the operation button 8.

Further, the portable information terminal apparatus further includes a communication card 16 through which the image processed by the image processing device 12 may be transmitted to an external device. The communication card 16 is inserted into the memory card slot 9 illustrated in FIG. 37B.

EXAMPLES

A detailed description is given of Examples 1 to 5 regarding the imaging lens system 1.

Example 1

FIG. 1 is a cross-sectional view of lenses arranged in the imaging lens system 1 according to Example 1 focused at infinity.

FIG. 31 is a table of optical data of the imaging lens system 1 according to Example 1.

FIG. 31 represents data regarding the radius of curvature, distance between surfaces, refractive index of material, and the Abbe number of each lens surface in the upper portion of the table.

The symbol "NO" denotes the number of the surface counted from the object side (the left side in FIG. 1) (including the lens surface and the surface of a stop S), the symbol "R" denotes the radius of curvature of each surface, the symbol "D" denotes the distance between adjacent surfaces, the symbol "N (D)" denotes the refractive index with respect to the d line, and the symbol "V (D)" denotes the Abbe number with respect to the d line. The mark "*" is indicated at surface numbers of "aspherical surfaces".

FIG. 31 represents data regarding aspherical surface (aspherical data) in the middle part of the table. Each aspherical surface is represented by the formula below where Z denotes the degree of asphericity, r denotes the height from the optical axis, K denotes the conical constant, and A4, A6, A8, A10, and A12 denote the aspherical surface coefficients of the fourth order, sixth order, eighth order, tenth order, and twelfth order, respectively:

$$Z=(1/R)r2/[1+\sqrt{1-(1+k)(1/R)2r2}]+A4*r4+A6*r6+A8*r8+A10*r10+A12*r12$$

The item "various data" in FIG. 31 represents various numerical data regarding, for example, the F-numbers and focal lengths of the imaging lens system 1 focused at infinity and an object at close range.

Figure 2:
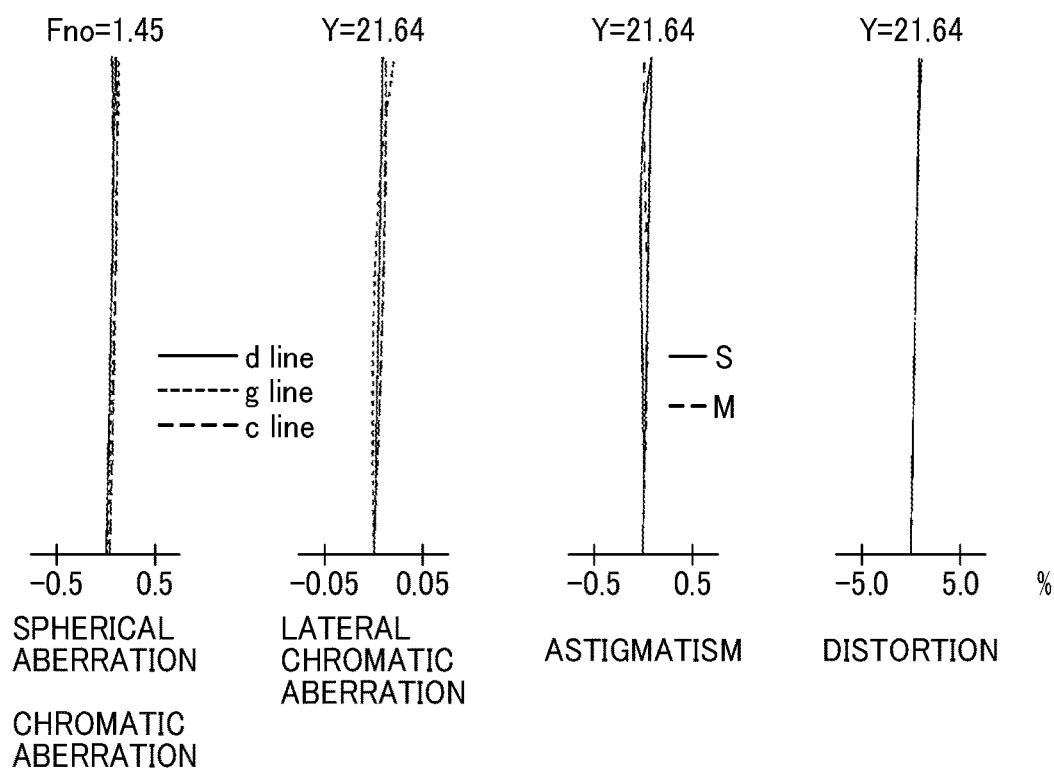
FIG. 2 is an illustration of a collection of aberration diagrams of spherical aberration, lateral chromatic aberration, astigmatism, and distortion, respectively in the imaging lens system according to Example 1 focused at infinity.

FIG. 2 is an illustration of a collection of aberration diagrams of spherical aberration, lateral chromatic aberration, astigmatism, and distortion, respectively in the imaging lens system 1 according to Example 1 focused at infinity.

Figure 3:
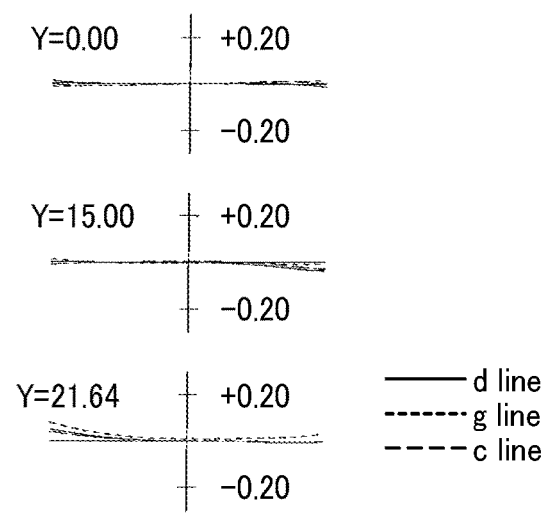
FIG. 3 is an illustration of a collection of lateral aberration diagrams of the imaging lens system according to Example 1 focused at infinity.

FIG. 3 is an illustration of a collection of lateral aberration diagrams of the imaging lens system 1 according to Example 1 focused at infinity.

Figure 4:
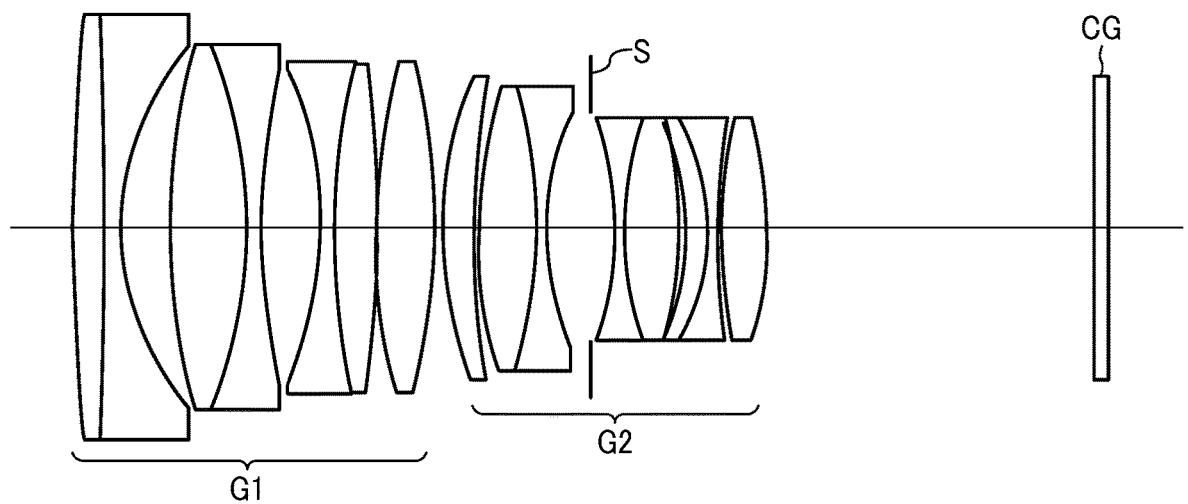
FIG. 4 is a cross-sectional view of lenses arranged in the imaging lens system according to Example 1 focused at close range.

FIG. 4 is a cross-sectional view of lenses arranged in the imaging lens system 1 according to Example 1 focused at close range.

In changing the focus from infinity to short range, the first group G1 stays still, whereas the second group G2 as a whole moves to the object side.

Figure 5:
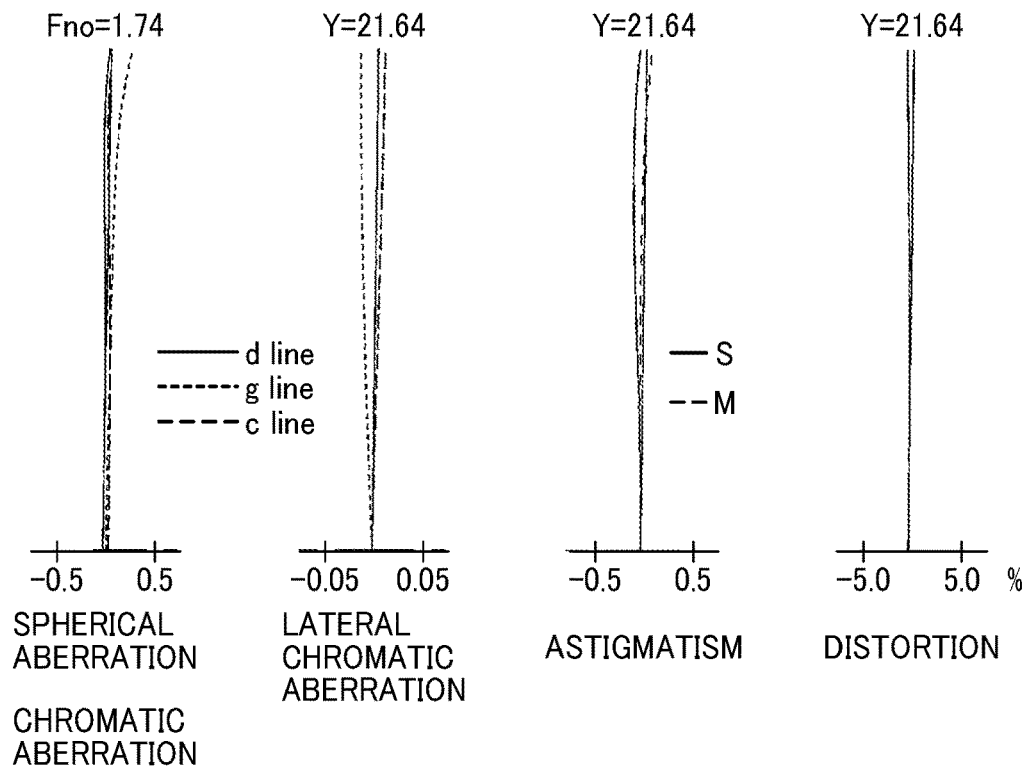
FIG. 5 is an illustration of a collection of aberration diagrams of spherical aberration, lateral chromatic aberration, astigmatism, and distortion, respectively in the imaging lens system according to Example 1 focused at close range.

FIG. 5 is an illustration of a collection of aberration diagrams of spherical aberration, lateral chromatic aberration, astigmatism, and distortion, respectively in the imaging lens system 1 according to Example 1 focused at close range.

Figure 6:
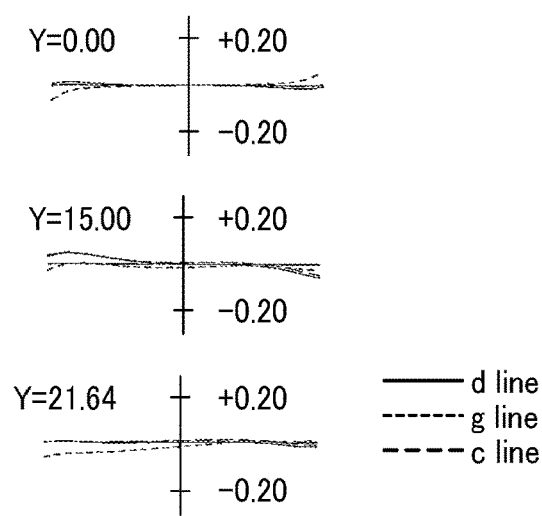
FIG. 6 is an illustration of a collection of lateral aberration diagrams of the imaging lens system according to Example 1 focused at close range.

FIG. 6 is an illustration of a collection of lateral aberration diagrams of the imaging lens system 1 according to Example 1 focused at close range.

Example 2

Figure 7:
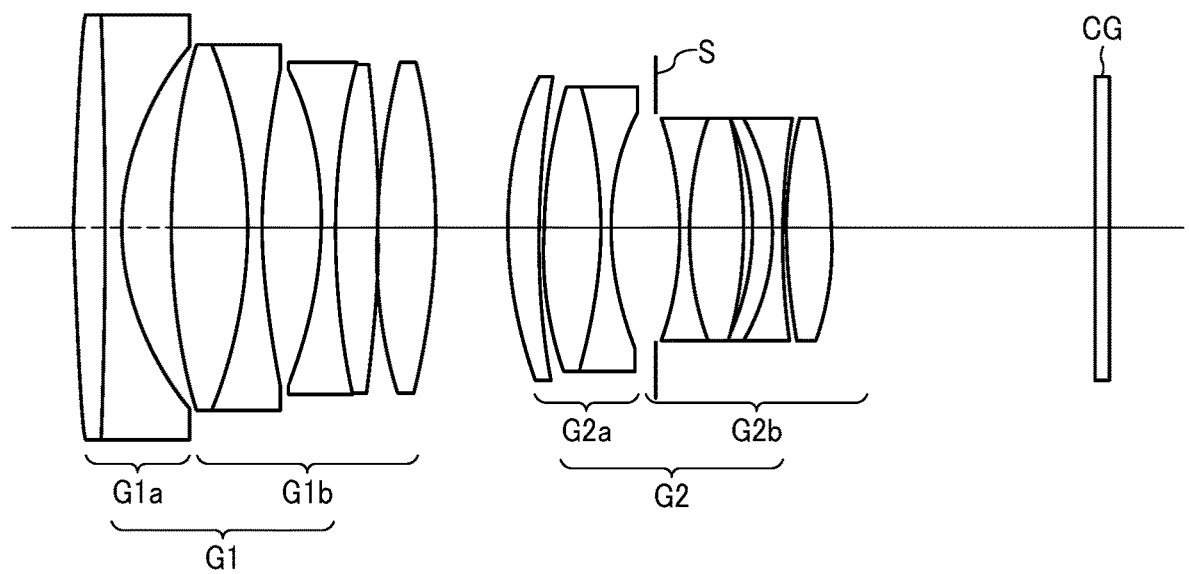
FIG. 7 is a cross-sectional view of lenses arranged in an imaging lens system according to Example 2 focused at infinity.

FIG. 7 is a cross-sectional view of lenses arranged in the imaging lens system 1 according to Example 2 focused at infinity.

FIG. 32 is a table of the optical data of the imaging lens system 1 according to Example 2.

Figure 8:
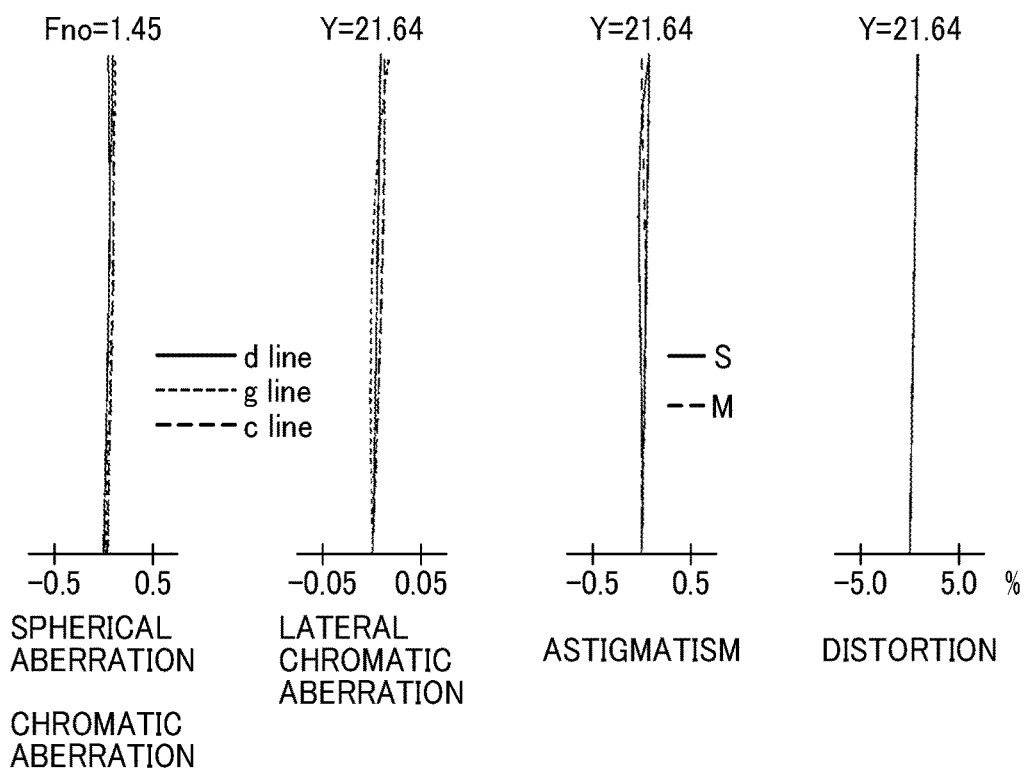
FIG. 8 is an illustration of a collection of aberration diagrams of spherical aberration, lateral chromatic aberration, astigmatism, and distortion, respectively in the imaging lens system according to Example 2 focused at infinity.

FIG. 8 is an illustration of a collection of aberration diagrams of spherical aberration, lateral chromatic aberration, astigmatism, and distortion, respectively in an imaging lens system 1 according to Example 2 focused at infinity.

Figure 9:
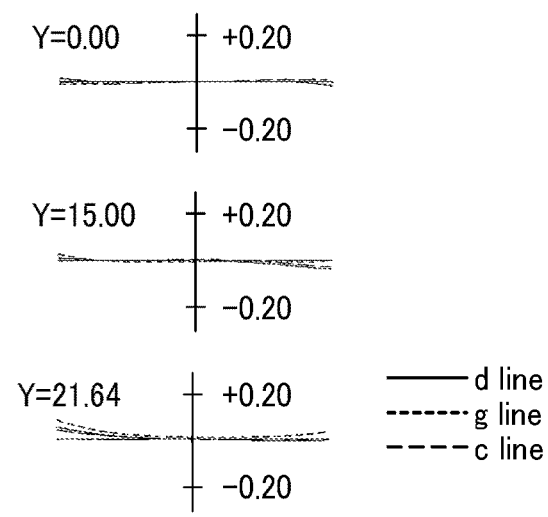
FIG. 9 is an illustration of a collection of lateral aberration diagrams of the imaging lens system according to Example 2 focused at infinity.

FIG. 9 is an illustration of a collection of lateral aberration diagrams of the imaging lens system 1 according to Example 2 focused at infinity.

Figure 10:
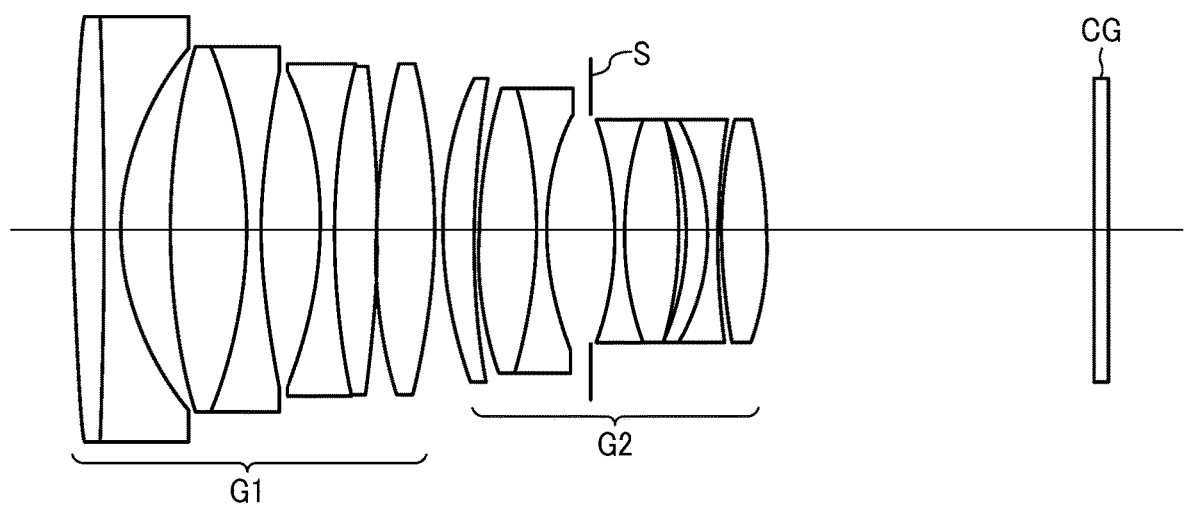
FIG. 10 is a cross-sectional view of lenses arranged in the imaging lens system according to Example 2 focused at close range.

FIG. 10 is a cross-sectional view of lenses arranged in the imaging lens system 1 according to Example 2 focused at close range.

In changing the focus from infinity to short range, the first group G1 stays still, whereas the second group G2 as a whole moves to the object side.

Figure 11:
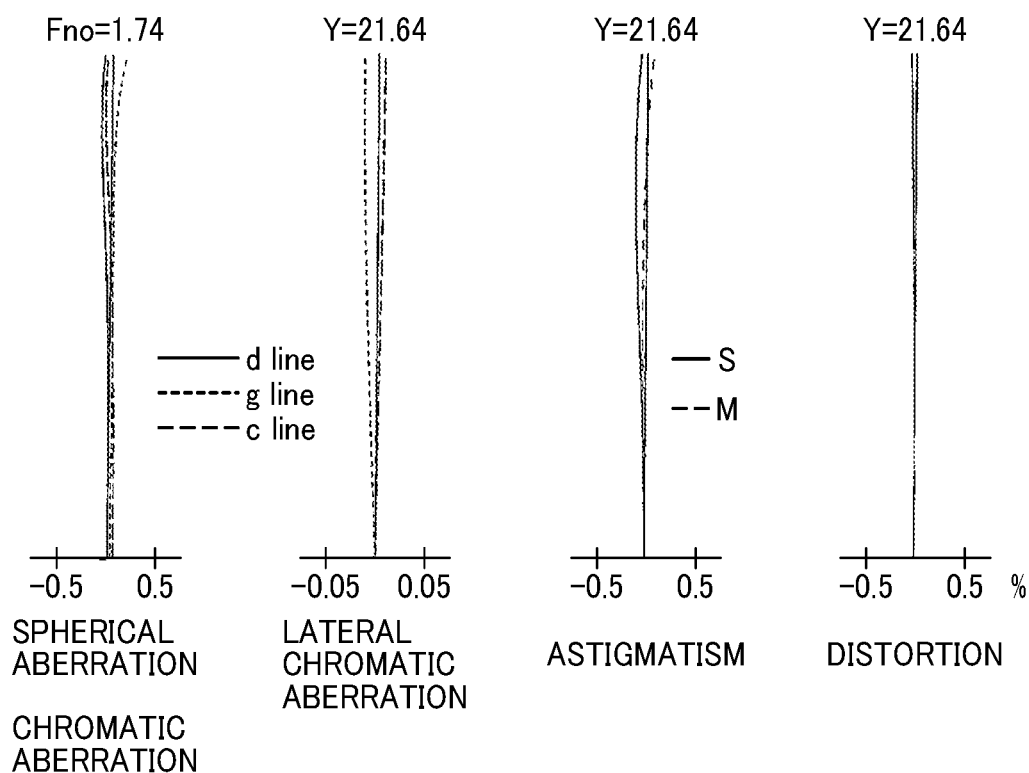
FIG. 11 is an illustration of a collection of aberration diagrams of spherical aberration, lateral chromatic aberration, astigmatism, and distortion, respectively in the imaging lens system according to Example 2 focused at close range.

FIG. 11 is an illustration of a collection of aberration diagrams of spherical aberration, lateral chromatic aberration, astigmatism, and distortion, respectively in the imaging lens system 1 according to Example 2 focused at close range.

Figure 12:
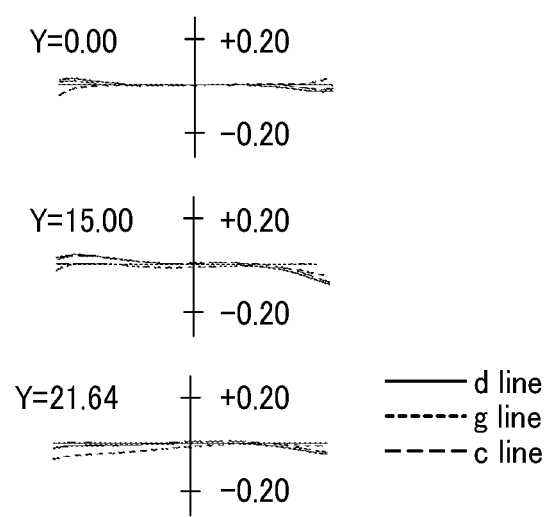
FIG. 12 is an illustration of a collection of lateral aberration diagrams of the imaging lens system according to Example 2 focused at close range.

FIG. 12 is an illustration of a collection of lateral aberration diagrams of the imaging lens system 1 according to Example 2 focused at close range.

Example 3

Figure 13:
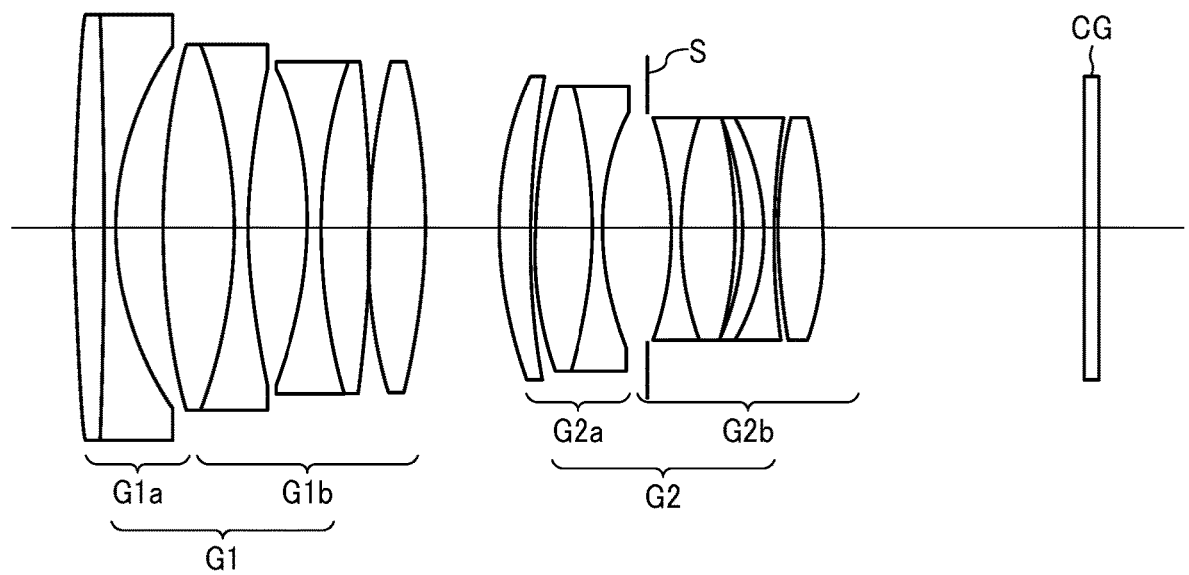
FIG. 13 is a cross-sectional view of lenses arranged in an imaging lens system according to Example 3 focused at infinity.

FIG. 13 is a cross-sectional view of lenses arranged in the imaging lens system 1 according to Example 3 focused at infinity.

FIG. 33 is a table of the optical data of the imaging lens system 1 according to Example 3.

Figure 14:
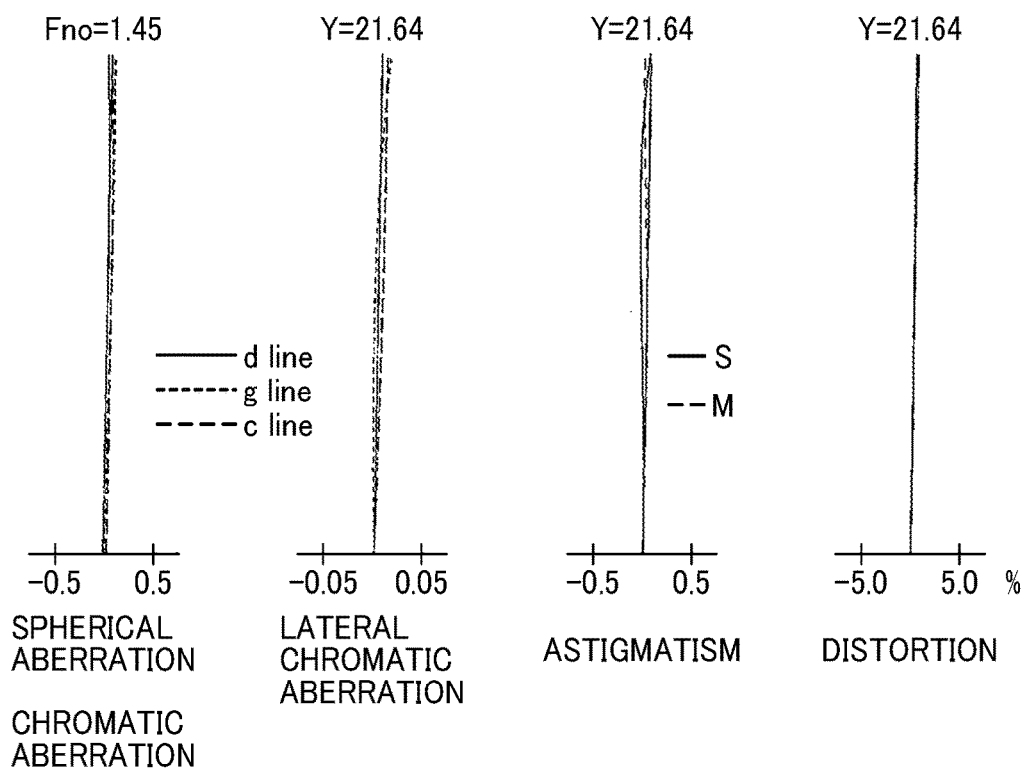
FIG. 14 is an illustration of a collection of aberration diagrams of spherical aberration, lateral chromatic aberration, astigmatism, and distortion, respectively in the imaging lens system according to Example 3 focused at infinity.

FIG. 14 is an illustration of a collection of aberration diagrams of spherical aberration, lateral chromatic aberration, astigmatism, and distortion, respectively in an imaging lens system 1 according to Example 3 focused at infinity.

Figure 15:
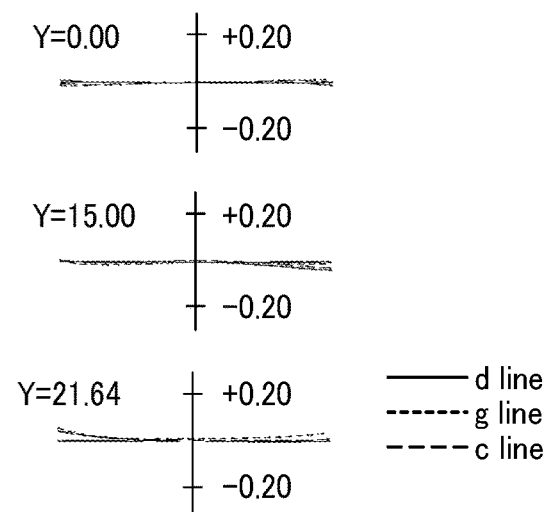
FIG. 15 is an illustration of a collection of lateral aberration diagrams of the imaging lens system according to Example 3 focused at infinity.

FIG. 15 is an illustration of a collection of lateral aberration diagrams of the imaging lens system 1 according to Example 3 focused at infinity.

Figure 16:
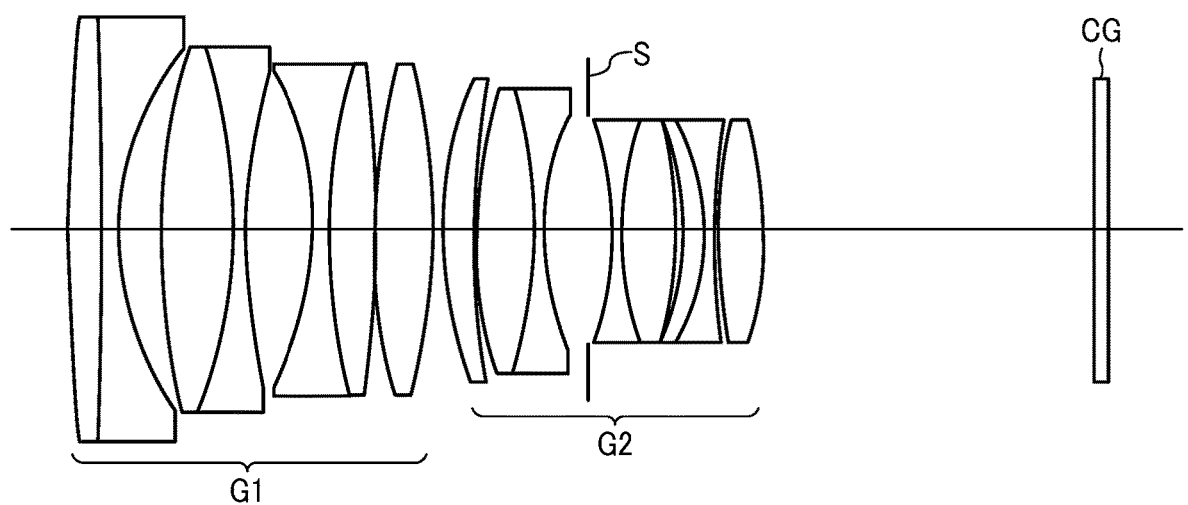
FIG. 16 is a cross-sectional view of lenses arranged in the imaging lens system according to Example 3 focused at close range.

FIG. 16 is a cross-sectional view of lenses arranged in the imaging lens system 1 according to Example 3 focused at close range.

In changing the focus from infinity to short range, the first group G1 stays still, whereas the second group G2 as a whole moves to the object side.

Figure 17:
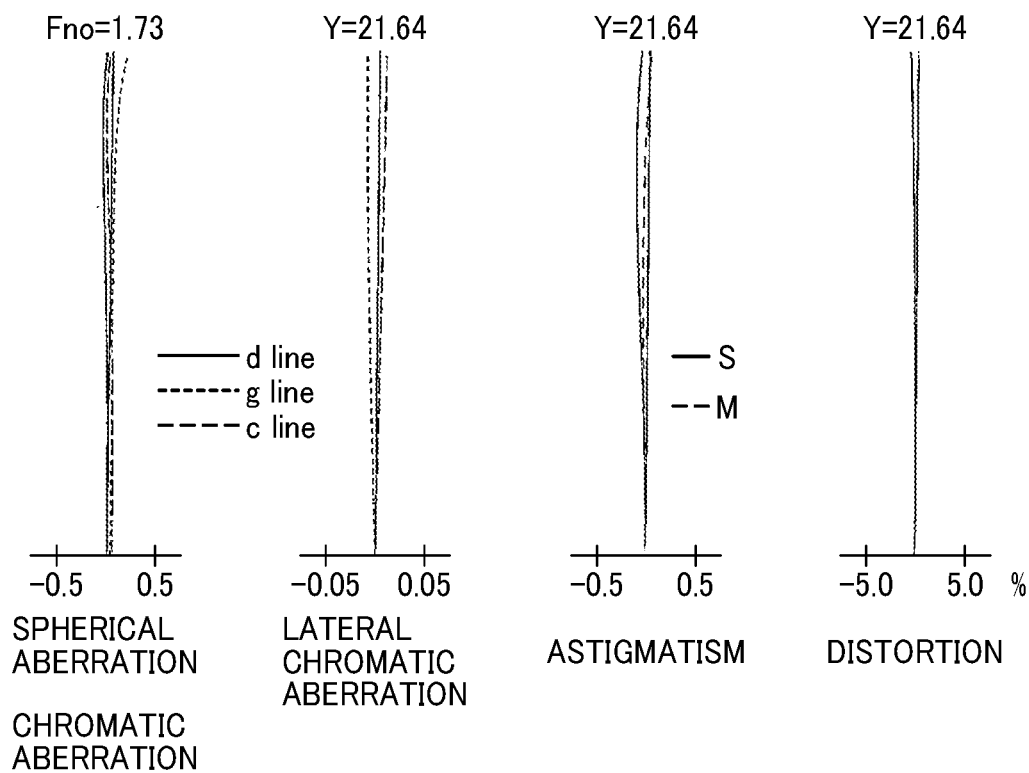
FIG. 17 is an illustration of a collection of aberration diagrams of spherical aberration, lateral chromatic aberration, astigmatism, and distortion, respectively in the imaging lens system according to Example 3 focused at close range.

FIG. 17 is an illustration of a collection of aberration diagrams of spherical aberration, lateral chromatic aberration, astigmatism, and distortion, respectively in the imaging lens system 1 according to Example 3 focused at close range.

Figure 18:
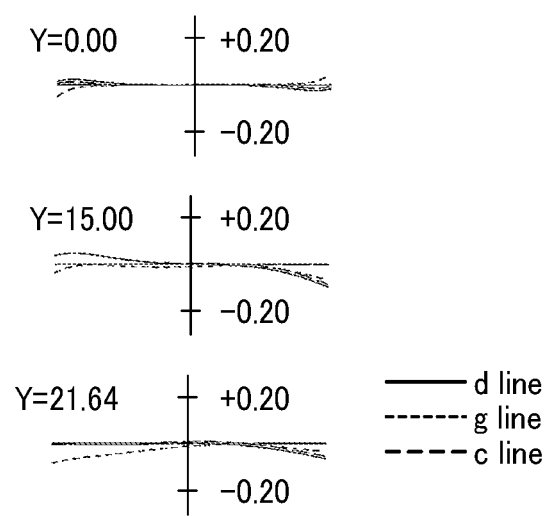
FIG. 18 is an illustration of a collection of lateral aberration diagrams of the imaging lens system according to Example 3 focused at close range.

FIG. 18 is an illustration of a collection of lateral aberration diagrams of the imaging lens system 1 according to Example 3 focused at close range.

Example 4

Figure 19:
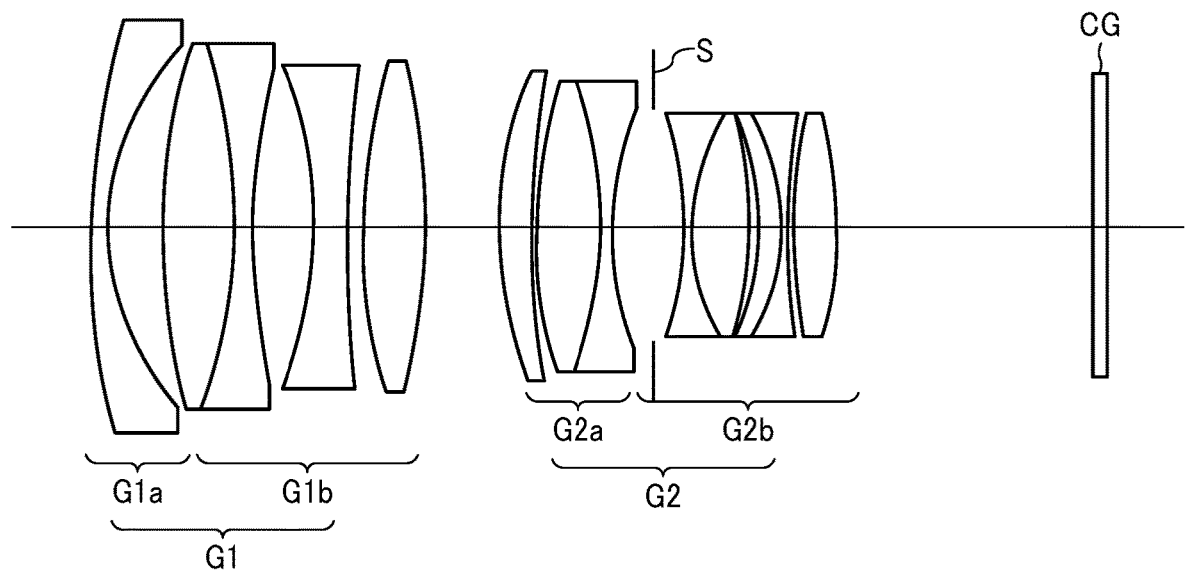
FIG. 19 is a cross-sectional view of lenses arranged in an imaging lens system according to Example 4 focused at infinity.

FIG. 19 is a cross-sectional view of lenses arranged in the imaging lens system 1 according to Example 4 focused at infinity.

FIG. 34 is a table of the optical data of the imaging lens system 1 according to Example 4.

Figure 20:
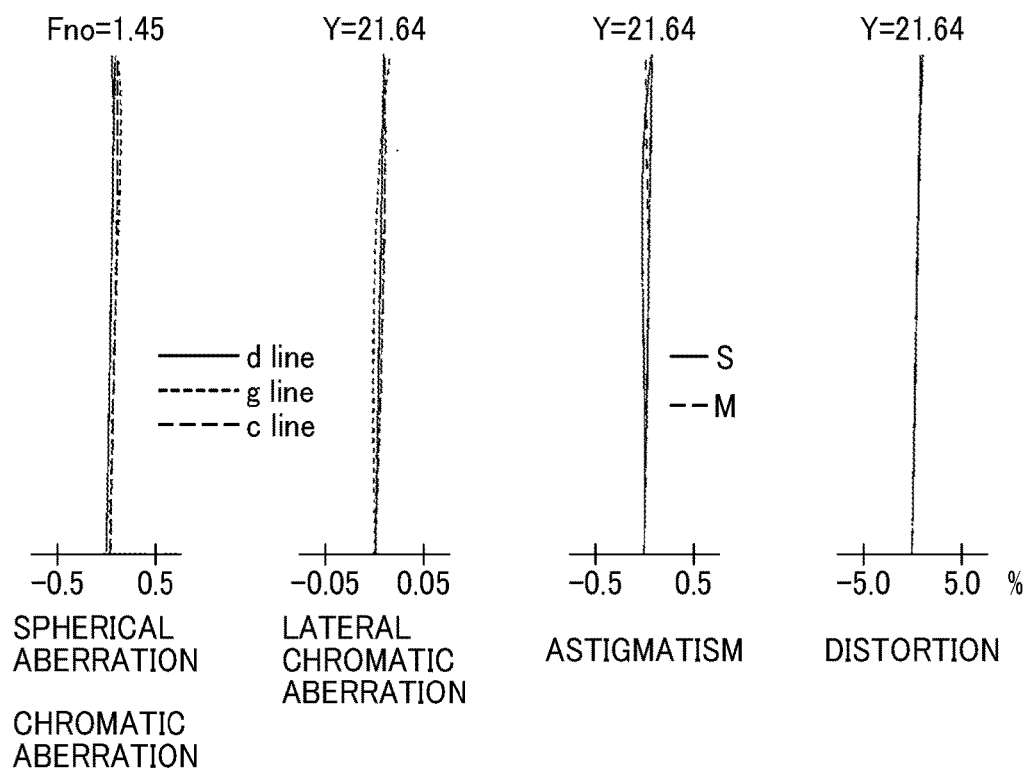
FIG. 20 is an illustration of a collection of aberration diagrams of spherical aberration, lateral chromatic aberration, astigmatism, and distortion, respectively in the imaging lens system according to Example 4 focused at infinity.

FIG. 20 is an illustration of a collection of aberration diagrams of spherical aberration, lateral chromatic aberration, astigmatism, and distortion, respectively in an imaging lens system 1 according to Example 4 focused at infinity.

Figure 21:
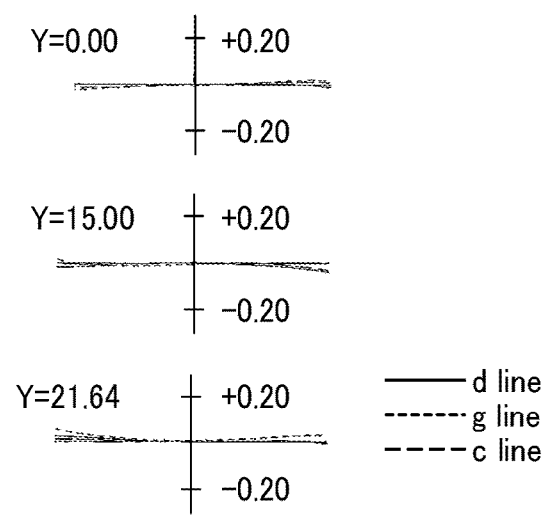
FIG. 21 is an illustration of a collection of lateral aberration diagrams of the imaging lens system according to Example 4 focused at infinity.

FIG. 21 is an illustration of a collection of lateral aberration diagrams of the imaging lens system 1 according to Example 4 focused at infinity.

Figure 22:
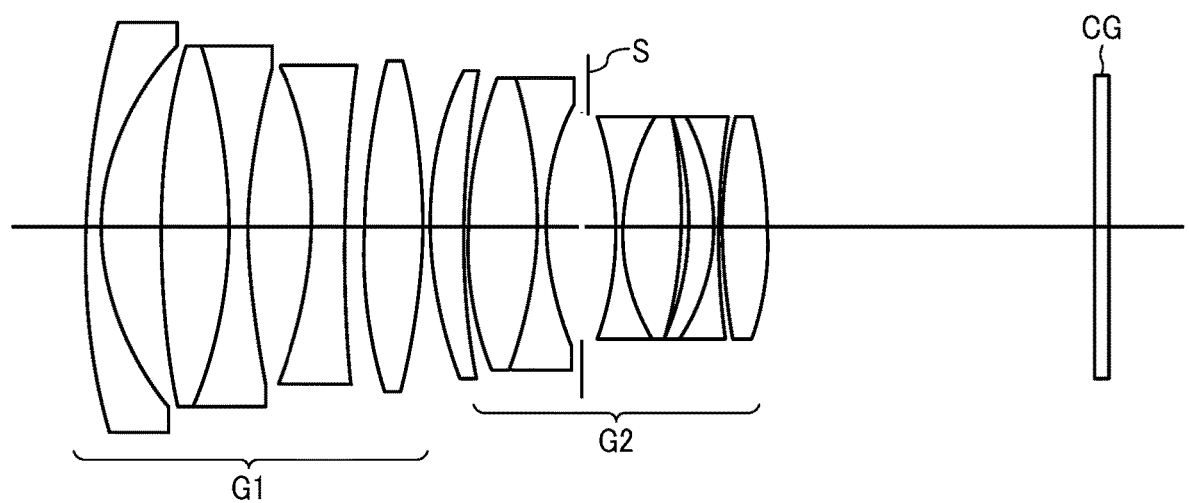
FIG. 22 is a cross-sectional view of lenses arranged in the imaging lens system according to Example 4 focused at close range.

FIG. 22 is a cross-sectional view of lenses arranged in the imaging lens system 1 according to Example 4 focused at close range.

In changing the focus from infinity to short range, the first group G1 stays still, whereas each of the group G2a and the group G2b of the second group G2 independently moves by a different amount.

Figure 23:
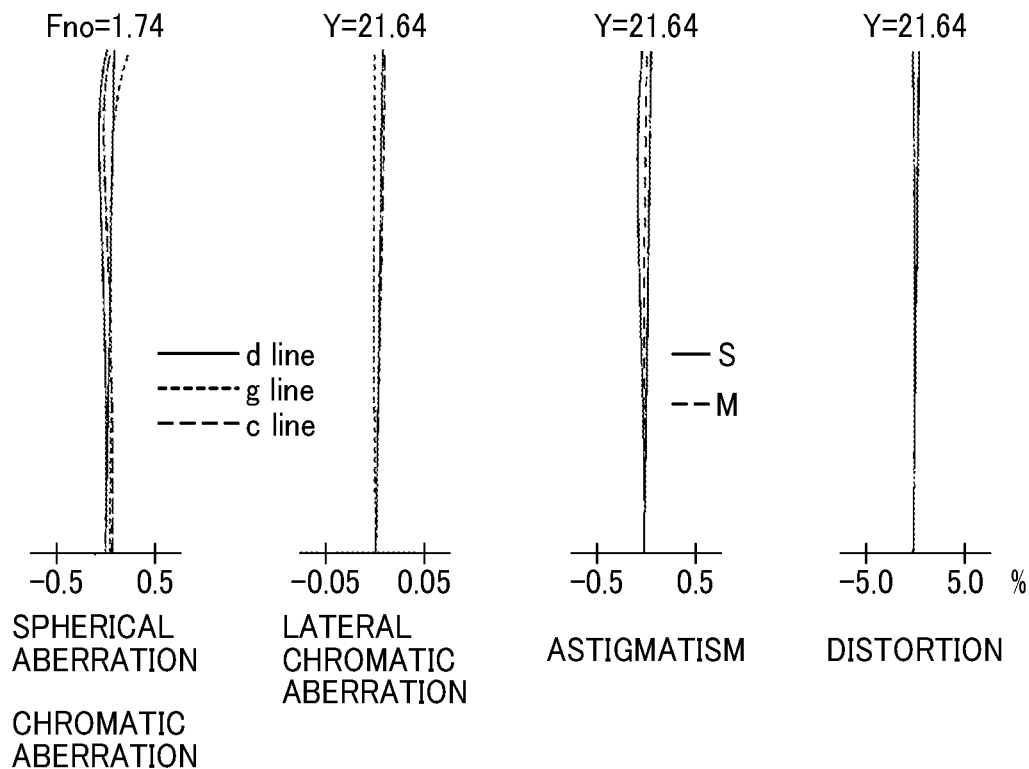
FIG. 23 is an illustration of a collection of aberration diagrams of spherical aberration, lateral chromatic aberration, astigmatism, and distortion, respectively in the imaging lens system according to Example 4 focused at close range.

FIG. 23 is an illustration of a collection of aberration diagrams of spherical aberration, lateral chromatic aberration, astigmatism, and distortion, respectively in the imaging lens system 1 according to Example 4 focused at close range.

Figure 24:
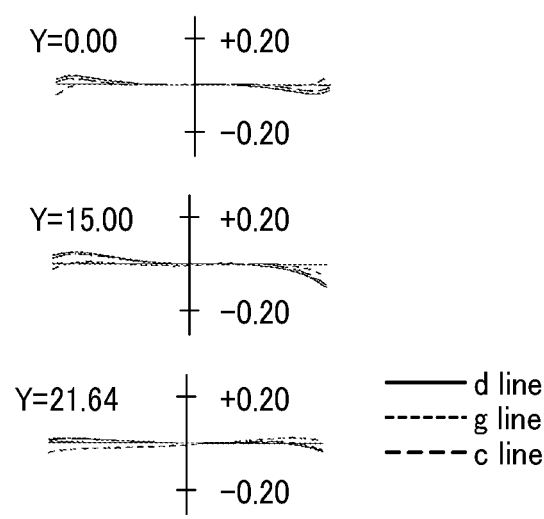
FIG. 24 is an illustration of a collection of lateral aberration diagrams of the imaging lens system according to Example 4 focused at close range.

FIG. 24 is an illustration of a collection of lateral aberration diagrams of the imaging lens system 1 according to Example 4 focused at close range.

Example 5

Figure 25:
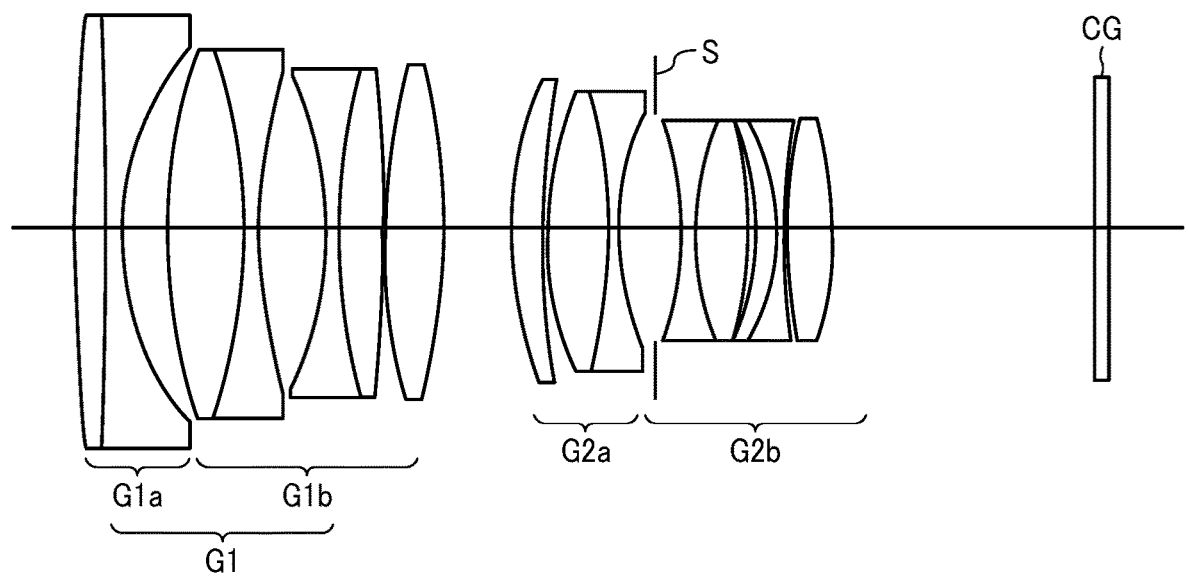
FIG. 25 is a cross-sectional view of lenses arranged in an imaging lens system according to Example 5 focused at infinity.

FIG. 25 is a cross-sectional view of lenses arranged in the imaging lens system 1 according to Example 5 focused at infinity.

FIG. 35 is a table of the optical data of the imaging lens system 1 according to Example 5.

Figure 26:
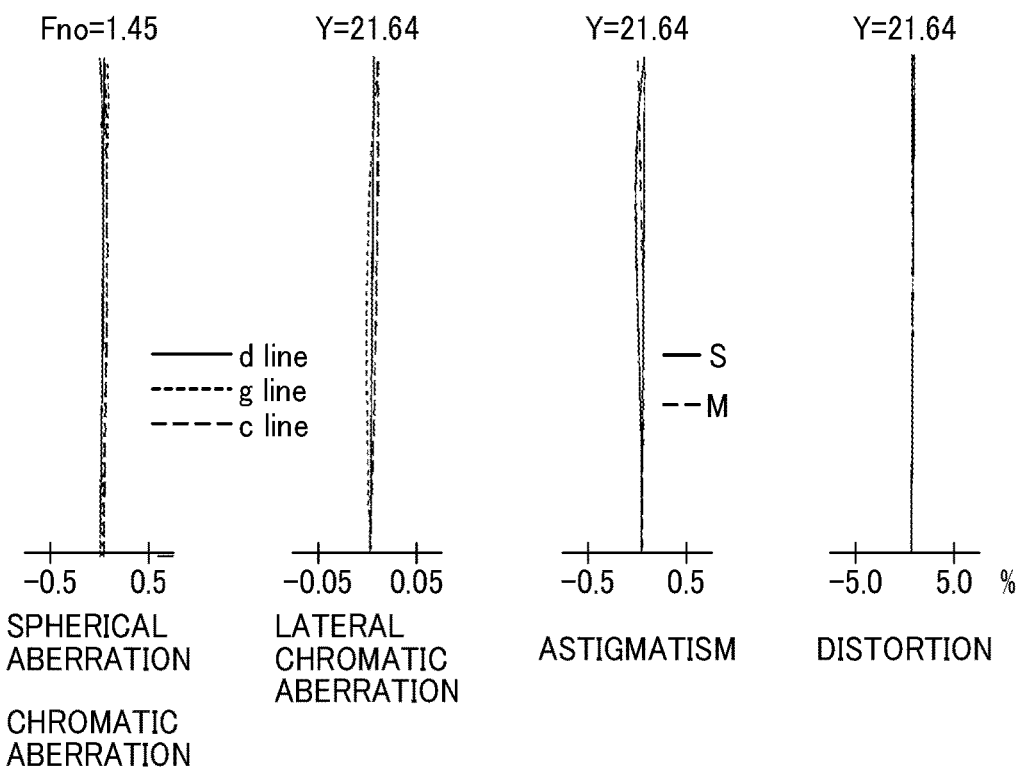
FIG. 26 is an illustration of a collection of aberration diagrams of spherical aberration, lateral chromatic aberration, astigmatism, and distortion, respectively in the imaging lens system according to Example 5 focused at infinity.

FIG. 26 is an illustration of a collection of aberration diagrams of spherical aberration, lateral chromatic aberration, astigmatism, and distortion, respectively in an imaging lens system 1 according to Example 5 focused at infinity.

Figure 27:
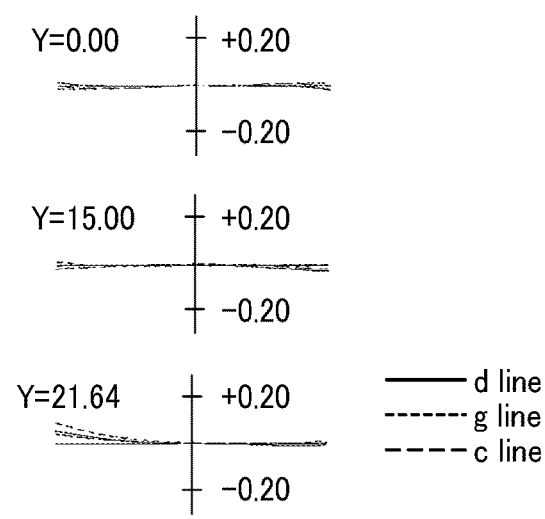
FIG. 27 is an illustration of a collection of lateral aberration diagrams of the imaging lens system according to Example 5 focused at infinity.

FIG. 27 is an illustration of a collection of lateral aberration diagrams of the imaging lens system 1 according to Example 5 focused at infinity.

Figure 28:
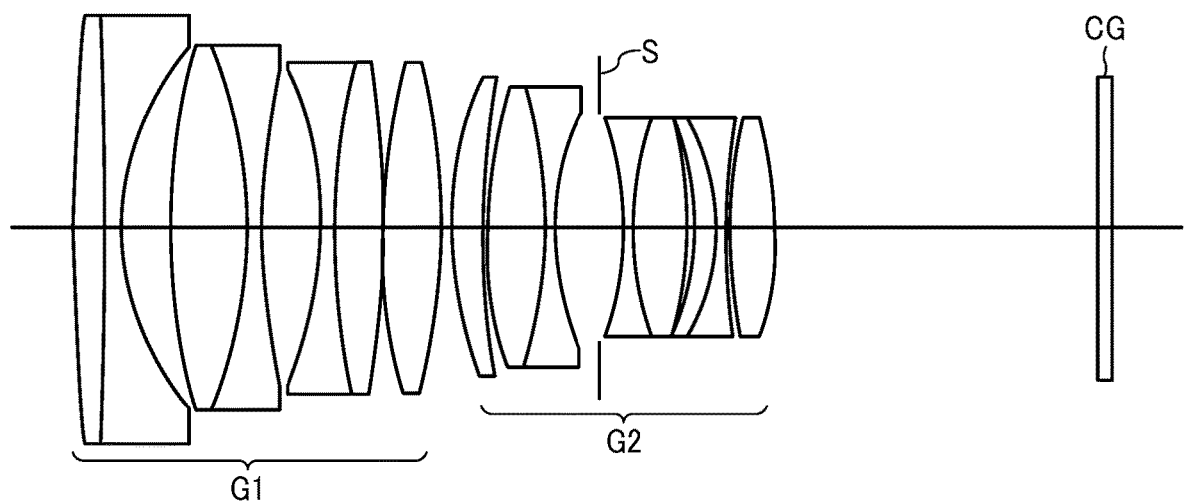
FIG. 28 is a cross-sectional view of lenses arranged in the imaging lens system according to Example 5 focused at close range.

FIG. 28 is a cross-sectional view of lenses arranged in the imaging lens system 1 according to Example 5 focused at close range.

In changing the focus from infinity to short range, each of the first group G1, the group G2a, and the group G2b of the second group G2 independently moves by a different amount.

Figure 29:
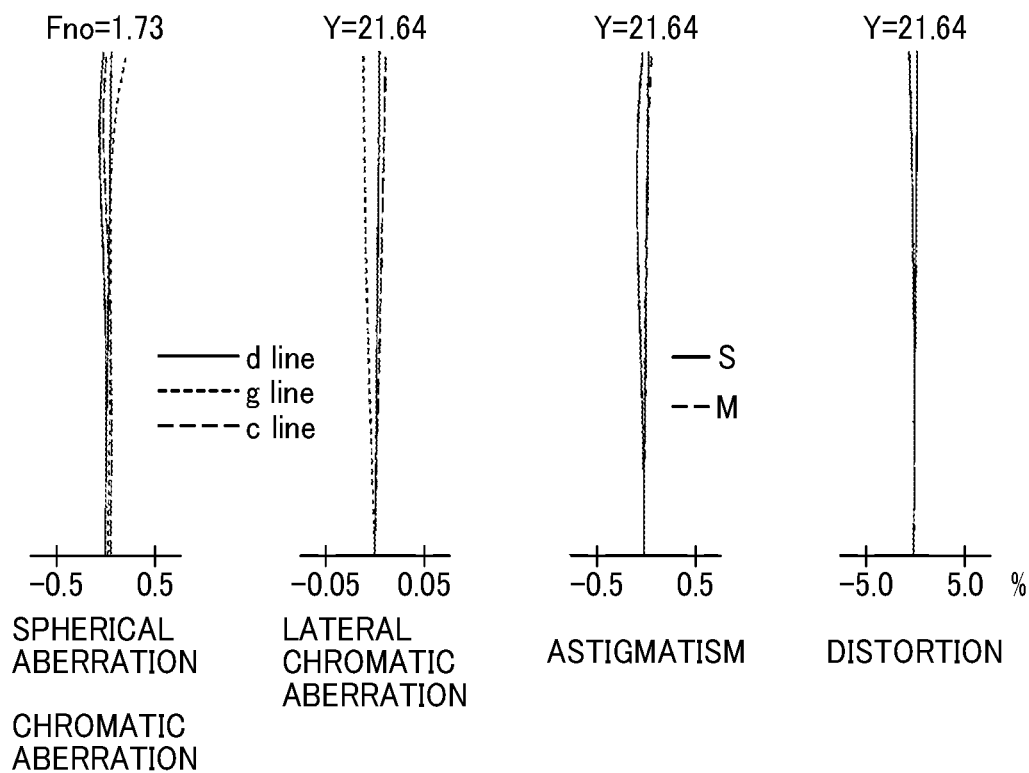
FIG. 29 is an illustration of a collection of aberration diagrams of spherical aberration, lateral chromatic aberration, astigmatism, and distortion, respectively in the imaging lens system according to Example 5 focused at close range.

FIG. 29 is an illustration of a collection of aberration diagrams of spherical aberration, lateral chromatic aberration, astigmatism, and distortion, respectively in the imaging lens system 1 according to Example 5 focused at close range.

Figure 30:
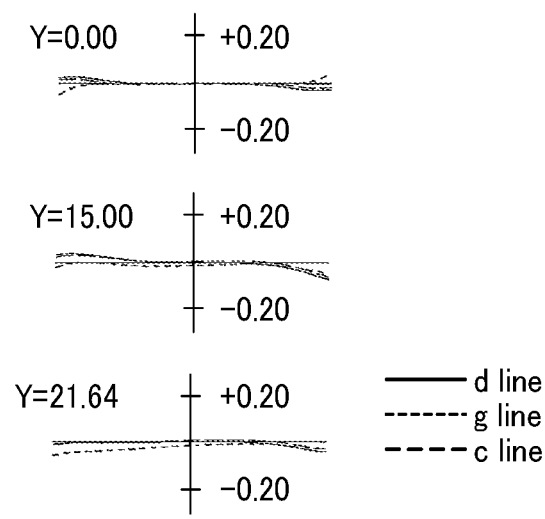
FIG. 30 is an illustration of a collection of lateral aberration diagrams of the imaging lens system according to Example 5 focused at close range.

FIG. 30 is an illustration of a collection of lateral aberration diagrams of the imaging lens system 1 according to Example 5 focused at close range.

FIG. 36 is a table of values of conditional expressions (1) to (5) according to Examples 1 to 5 described above. In FIG. 36, the symbol "*1" denotes a value of $-0.002 \, vd11+0.656$ and the symbol "*2" denotes a value of $-0.00162 \, vd22+0.64$.

As illustrated in each aberration diagram, the imaging lens systems 1 according to Examples 1 to 5 has extremely-well corrected aberrations and high performance both when focused at infinity and when focused at short range.

With the configuration according to any of Examples 1 to 5, a high-performance imaging lens system having a back focal length sufficient for a single-lens reflex camera, a high F-value of approximately 1.4 and an angle of view of around 45 degrees can be obtained.

The present disclosure is not limited to the details of the example embodiments described above, and various modifications and improvements are possible.

The advantageous effects described in the embodiments of the present disclosure are preferred effects provided by disclosure, and the preferred effects are just recited; therefore, advantageous effects of the present disclosure are not limited to the effects described in the embodiments.

Although the embodiments of the present disclosure have been described above, the present disclosure is not limited to the embodiments described above, but a variety of modifications can naturally be made within the scope of the present disclosure. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An imaging lens system comprising:
a first group having positive power; and
a second group having positive power,
the first group and the second group being disposed in that order from an object side to an image side of the imaging lens system,
the first group consisting of a first sub-group and a second sub-group adjacent to the first sub-group on the image side, the first sub-group including a negative lens or a cemented lens having negative refractive power at a position closest to the object side within the first sub-group,
the second group including a third sub-group, a stop, and a fourth sub-group disposed in that order from the object side to the image side,
the second group being configured to be movable to the object side with a change in a distance between the first group and the second group during a change in a focus of the imaging lens system from infinity to close range, and
conditional expressions (1), (2), and (3) below are satisfied:

$$0.07 < f2/f1 < 0.4 \tag{1}$$

$$0.45 < f2/f2a < 0.7 \tag{2); and}$$

$$1.05 < f/R1aN < 1.55 \tag{3}$$

where
f denotes a focal length of an entirety of the imaging lens system focused at infinity,
f1 denotes a focal length of the first group,
f2 denotes a focal length of the second group when the imaging lens system is focused at infinity,
f2a denotes a focal length of the third sub-group when the imaging lens system is focused at infinity, and
R1aN denotes a radius of curvature of a surface closest to the image side within the first sub-group,
wherein the second sub-group consists of a positive lens component having positive power, a negative lens component, and a positive lens, which are disposed in that order from the object side to the image side, the positive lens component being a cemented lens made of a positive lens with a convex surface facing the object side and a negative lens, the negative lens component being one of a negative lens and a cemented lens,
wherein conditional expression (5) below is satisfied:

$$1.75 < n12P \tag{5}$$

where
n12P denotes a refractive index of material of the positive lens having a convex surface facing the object side, of the positive lens component in the second sub-group.

2. The imaging lens system according to claim 1, wherein conditional expression (4) below is satisfied:

$$-0.75 < f/f1a < -0.45 \tag{4}$$

where
f denotes the focal length of the entirety of the imaging lens system focused at infinity, and
f1a denotes a focal length of the first sub-group.

3. The imaging lens system according to claim 1, wherein the second group includes one or more negative lenses, and
wherein conditional expression (6) below is satisfied:

$$1.55 < n2GN < 1.62 \tag{6}$$

where
n2GN denotes an average of refractive indexes of material of the one or more negative lenses in the second group.

4. The imaging lens system according to claim 1,
wherein the third sub-group includes one or more positive lenses and one or more negative lenses, and
wherein conditional expression (7) below is satisfied:

$$50 < v2aP \quad (7)$$

where
v2aP denotes an average of Abbe numbers of material of the one or more positive lenses in the third sub-group.

5. The imaging lens system according to claim 1,
wherein the first sub-group includes a positive lens with a convex surface facing the object side and a negative lens, which are disposed in that order from the object side to the image side,
wherein conditional expressions (8) and (9) below are satisfied:

$$30 < vd11 < 50 \quad (8); \text{ and}$$

$$\theta gF11 > -0.002 \times vd11 + 0.656 \quad (9)$$

where
vd11 denotes Abbe number of material of the positive lens closest to the object side within the first sub-group, and
θgf11 denotes a partial dispersion ratio with respect to g line of the positive lens closest to the object side within the first sub-group.

6. The imaging lens system according to claim 1,
wherein the fourth sub-group includes an object-side cemented lens made of a negative lens and a positive lens and an image-side cemented lens made of a positive meniscus lens with a convex surface facing the image side and a negative lens, the object-side cemented lens and the image-side cemented lens being disposed in that order from the object side to the image side,
wherein conditional expressions (10), (11), and (12) below are satisfied:

$$vd22 > 55 \quad (10);$$

$$\theta gF22 > -0.00162 \times vd22 + 0.64 \quad (11); \text{ and}$$

$$1.70 < n2P \quad (12)$$

where
vd22 denotes Abbe number of material of the positive lens of the object-side cemented lens,
θgF22 denotes a partial dispersion ratio with respect to g line of the material of the positive lens of the object-side cemented lens, and
n2P denotes a refractive index of material of the positive meniscus lens of the image-side cemented lens.

7. An imaging apparatus comprising the imaging lens system according to claim 1.

8. The imaging lens system according to claim 1,
wherein the second group includes more than one negative lens.

* * * * *